United States Patent
Filippov et al.

(10) Patent No.: US 12,348,788 B2
(45) Date of Patent: *Jul. 1, 2025

(54) METHOD AND APPARATUS OF INTERPOLATION FILTERING FOR PREDICTIVE CODING

(71) Applicant: HUAWEI TECHNOLOGIES CO., LTD., Guangdong (CN)

(72) Inventors: Alexey Konstantinovich Filippov, Moscow (RU); Vasily Alexeevich Rufitskiy, Moscow (RU); Jianle Chen, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/529,826

(22) Filed: Dec. 5, 2023

(65) Prior Publication Data

US 2024/0146974 A1 May 2, 2024

Related U.S. Application Data

(63) Continuation of application No. 17/351,957, filed on Jun. 18, 2021, now Pat. No. 11,877,013, which is a
(Continued)

(51) Int. Cl.
*H04N 19/59* (2014.01)
*H04N 19/105* (2014.01)
(Continued)

(52) U.S. Cl.
CPC ........... *H04N 19/82* (2014.11); *H04N 19/105* (2014.11); *H04N 19/50* (2014.11)

(58) Field of Classification Search
CPC ....... H04N 19/50; H04N 19/82; H04N 19/105
See application file for complete search history.

(56) References Cited

U.S. PATENT DOCUMENTS 9,451,254 B2 9/2016 Joshi et al.
9,948,939 B2* 4/2018 Zhang .................... H04N 19/61
(Continued)

FOREIGN PATENT DOCUMENTS

CN 103891289 A 6/2014
CN 104969551 A 10/2015
(Continued)

OTHER PUBLICATIONS

Block-Adaptive Interpolation Filter using for Sub-Pixel Motion Compensation; 2012. (Year: 2012).*
(Continued)

*Primary Examiner* — Luis Perez-Fuentes
(74) *Attorney, Agent, or Firm* — WOMBLE BOND DICKINSON (US) LLP

(57) ABSTRACT

The present disclosure relates to intra- or inter-prediction for video encoding and decoding. For that purpose, an apparatus and methods obtain a reference sample and a subpixel offset value. A 4-tap interpolation filter is used to filter the reference sample to obtain a predicted sample value. The filter coefficients $c_0$, $c_1$, $c_2$, and $c_3$ of the 4-tap interpolation filter satisfy $$c_0 = 16 - \frac{p}{2},$$

$$c_1 = 16 + 16 - \frac{p}{2},$$

$$c_2 = 16 + \frac{p}{2},$$

and $$c_3 = \frac{p}{2},$$

(Continued)

with p being a fractional part of the value of the subpixel offset.

16 Claims, 27 Drawing Sheets

Related U.S. Application Data continuation of application No. PCT/RU2019/050251, filed on Dec. 20, 2019.

(60) Provisional application No. 62/784,319, filed on Dec. 21, 2018.

(51) Int. Cl.
*H04N 19/50* (2014.01)
*H04N 19/82* (2014.01)

(56) References Cited

U.S. PATENT DOCUMENTS

| | | | | |
|---|---|---|---|---|
| 10,045,046 | B2* | 8/2018 | Panchal | H04N 19/154 |
| 10,341,659 | B2* | 7/2019 | Lee | H04N 19/184 |
| 10,904,565 | B2* | 1/2021 | Chuang | H04N 19/105 |
| 11,146,809 | B2* | 10/2021 | Chen | H04N 19/523 |
| 11,877,013 | B2* | 1/2024 | Filippov | H04N 19/182 |
| 12,192,513 | B2* | 1/2025 | Filippov | H04N 19/105 |
| 2010/0002770 | A1 | 1/2010 | Motta et al. | |
| 2014/0161189 | A1 | 6/2014 | Zhang et al. | |
| 2015/0023405 | A1 | 1/2015 | Joshi et al. | |
| 2016/0014425 | A1 | 1/2016 | Kirchhoffer et al. | |
| 2016/0191946 | A1 | 6/2016 | Zhou et al. | |
| 2018/0063531 | A1 | 3/2018 | Hu et al. | |
| 2018/0098066 | A1 | 4/2018 | Lee et al. | |
| 2018/0176596 | A1 | 6/2018 | Jeong et al. | |
| 2018/0262756 | A1 | 9/2018 | Filippov et al. | |
| 2018/0338150 | A1 | 11/2018 | Terada et al. | |
| 2021/0258608 | A1 | 8/2021 | Filippov et al. | |

FOREIGN PATENT DOCUMENTS

| | | |
|---|---|---|
| CN | 105379266 A | 3/2016 |
| CN | 108605124 A | 9/2018 |
| JP | 2019530351 A | 10/2019 |
| WO | 2017086823 A1 | 5/2017 |
| WO | 2018063886 A1 | 4/2018 |

OTHER PUBLICATIONS

Improved intra angular prediction by DCT based interpolation filter; Matsuo; Aug. 27, 2012. (Year: 2012).*

Document: JVET-L0324-v2, Geert Van der Auwera et al, CE3: Intra reference sample interpolation filter selection using MDIS conditions (Test 3.1.2), Joint Video Experts Team (JVET) of ITU-T SG 16 WP 3 and ISO/IEC JTC 1/SC 29/ WG11, 12th Meeting: Macau, CN, Oct. 3-12, 2018, 14 pages, XP030194317.

Document: JVET-M0158-v2, Alexey Filippov et al, Non-CE3: LUT-free interpolation filters for intra prediction, Joint Video Experts Team (JVET) of ITU-T SG 16 WP 3 and ISO/IECJTC 1/SC 29/WVG11, 13th Meeting: Marrakech, MA, Jan. 9-18, 2019, 9 pages, XP030202203.

Van Der Auwera, Geert et al., CE3-related: On MDIS and intra interpolation filter switching, Joint Video Experts Team (JVET) of ITU-T SG 16 WP 3 and ISO/IEC JTC 1/SC 29/WG 11 11th Meeting: Ljubljana, SI, Jul. 10-18, 2018, [JVET-K0064-v2], JVET-K0064 (version 2), ITU-T, Jul. 13, 2018, URL:http://phenix.itsudparis.eu/jvet/doc_end_user/documents/11_Ljubljana/wg11/JVET-K0064-v2.zip>: JVET-K0064_v2.docx: pp. 1-7.

* cited by examiner

METHOD AND APPARATUS OF INTERPOLATION FILTERING FOR PREDICTIVE CODING

CROSS-REFERENCE TO RELATED APPLICATIONS

This application is a continuation of U.S. patent application Ser. No. 17/351,957, filed on Jun. 18, 2021, which is a continuation of International Application No. PCT/RU2019/050251, filed on Dec. 20, 2019, which claims priority to U.S. Provisional Patent Application No. 62/784,319, filed on Dec. 21, 2018. All of the afore-mentioned patent applications are hereby incorporated by reference in their entireties.

TECHNICAL FIELD

Embodiments of the present application (disclosure) generally relate to the field of picture processing and more particularly to image and/or video coding and decoding, and in particular to method and apparatus for intra/inter-prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims and dependent claims.

The foregoing and other objects are achieved by the subject matter of the independent claims and dependent claims. Further implementation forms are apparent from the dependent claims, the description and the figures.

Embodiments of the disclosure are defined by the features of the independent claims, and further advantageous implementations of the embodiments by the features of the dependent claims.

According to an aspect of the present disclosure, a method is provided for intra- or inter-prediction processing of a video frame, comprising the operations of: obtaining a reference sample; obtaining a value of a subpixel offset; and filtering, using a subpixel 4-tap interpolation filter, the reference sample to obtain a predicted sample value, wherein filter coefficients of the subpixel 4-tap interpolation filter satisfy:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional part of the value of subpixel offset, and $c_0$, $c_1$, $c_2$, and $c_3$ are the filter coefficients of the subpixel 4-tap interpolation filter.

In one embodiment, the reference samples(s) may be referred to as ref[x], with ref[x]=p[−1−refIdx+x][−1−refIdx], with x=0 . . . nTbW+refIdx+1.

corresponding a an array of reference samples and "p" referring a x-y two-dimensional array p[x][y] containing sample values. The number of reference samples used may be at least one. In another example, the number of reference samples may be four.

In one embodiment, the obtained subpixel offset value may be referred to as (y+1+refIdx)*intraPredAngle with "IntraPredAngle" being the value of an intra-prediction angle.

In one embodiment, the predicted sample value "predSamples[x][y]" may be obtained by predSamples[$x$][$y$]=Clip1((($\Sigma_{i=0}^{3}$fT[$i$]*req[x+iIdx+i])+32)>>6)

with fT[i] referring to filter coefficients. These coefficients may be luma- or chroma filter coefficients for the inter-prediction, refered to as fG and fC respectively.

The selection of the filter coeffiients being luma or chroma may be implemented by use and setting of a flag "filterFlag", for example, as fT[j]=filterFlag? fG[iFact][j]: fC[iFact][j]

with iFact=((y+1+refIdx)*intraPredAngle) & 31.

The value "31" refers to the fractional part of the subpixel offset value, and may take other values different from "31". The values of the filter coefficients fG (luma) and/or fC (chroma) by be obtained analytically on-the-fly using the above analytical expression for the filter coefficients of the 4-tap filter. Thus, the filter coefficients are defined according to the subpixel offset value.

The filter coefficients are hence obtained without accessing the respecive values of the filter coefficients from a LUT, but rather are obtained by calculation.

In one embodiment, the filter coefficients may be calculated usign the above equations, and the values may be stored in a LUT.

According to an aspect of the present disclosure, the filter coefficients of the subpixel 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 |

According to an aspect of the present disclosure, a method is provided for intra- or inter-prediction processing of a video frame, comprising the operations of: obtaining a reference sample; obtaining a value of a subpixel offset; and filtering, using a subpixel 4-tap interpolation filter, the reference sample to obtain a predicted sample value, wherein filter coefficients of the subpixel 4-tap interpolation filter are defined as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients.

In one embodiment, the values of the filter coefficients may be stored in a LUT. This means that for the subpixel interpolation filtering the respective values of the filter coefficients are to be fetched from the LUT.

FIG. 23 shows a flowchart of the intra/inter-prediction processing. In operation 2301, a reference sample is obtained. The reference sample may include one or more reference samples. In operation 2302, a subpixel offset value is then obtained. In operation 2303, the reference sample is then filtered using the subpixel interpolation filter having filter coefficients $\{c_i\}$ with $i = 0, \ldots 3$. This is referred to as 4-tap filter and/or 4-point filter.

The filter coefficients may be obtained from analytical expressions with given fractional part p of the subpixel offset value. The filter coefficients may also be obtained from a LUT with reference to p values.

According to an aspect of the present disclosure, a bit of p is set to zero.

According to an aspect of the present disclosure, p is incremented by 1 and afterwards a lower bit of the incremented p is set to zero prior said p is used to obtain the filter coefficients.

According to an aspect of the present disclosure, the obtaining of the filter coefficients comprises the operation of calculating the filter coefficients according to $$c_0 = 16 - \frac{p}{2}$$
$$c_1 = 16 + c_0$$
$$c_2 = c_0 + p$$
$$c_3 = c_0 - p.$$

This may provide an advantage of calculating a filter coefficient $c_{i+1}$ from a previous filter coefficient $c_i$. This may reduce further the time for calculating the filter coefficients.

According to an aspect of the present disclosure, a method of video coding is provided, the method comprises intra-prediction processing of a block of a video frame, comprising: filtering, using a subpixel 4-tap interpolation filter, of a reference sample of the video frame; wherein the subpixel 4-tap interpolation filter is a combination of filters, with filter coefficients of at least one of the filters satisfy:

$$c_0 = 16 - \frac{p}{2}$$
$$c_1 = 16 + 16 - \frac{p}{2}$$

$$c_2 = 16 + \frac{p}{2}$$

$$c_3 = \frac{p}{2}$$

wherein p is a fractional sample position of a subpixel offset, and $c_0$, $c_1$, $c_2$, and $c_3$ are the filter coefficients.

FIG. 24 shows a flowchart of the video coding. In operation 2401, intra-prediction processing is performed by filtering of a reference sample of a block, using a subpixel 4-tap interpolation filter.

According to an aspect of the present disclosure, the subpixel 4-tap interpolation filter is a smoothing filter that is a parallel combination of two phase-dependent linear filters and a low-pass filter.

According to an aspect of the present disclosure, the subpixel 4-tap interpolation filter is a sharpening filter that is a parallel combination of one phase-dependent linear filter and strength-varying high-pass filter.

According to an aspect of the present disclosure, the strength-varying high-pass filter is a phase-independent high-pass finite impulse response, FIR, filter, the output of which is multiplied by a phase-dependent strength parameter.

According to any one of the previous aspects of the present disclosure, a lower bit of p is set to zero.

According to an aspect of the present disclosure, p is incremented by 1 and afterwards lower bit of the incremented value is set to zero prior this value is used to derive interpolation filter coefficients.

According to an aspect of the present disclosure, clipping operation is performed for the output of the strength-varying high-pass filter.

According to an aspect of the present disclosure, an apparatus is provided for intra- or inter-prediction processing of a video frame, including: a reference sample obtaining unit configured to obtain a reference sample; a subpixel offset value obtaining unit configured to obtain a value of a subpixel offset; and a subpixel 4-tap interpolation filter configured to filter the reference sample to obtain a predicted sample value, wherein filter coefficients of the subpixel 4-tap interpolation filter satisfy:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional part of the value of the subpixel offset, and $c_0$, $c_1$, $c_2$, and $c_3$ are the filter coefficients of the subpixel 4-tap interpolation filter.

According to an aspect of the present disclosure, the filter coefficients of the subpixel 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 |

According to an aspect of the present disclosure, an apparatus is provided for intra- or inter-prediction processing of a video frame, comprising: a reference sample obtaining unit configured to obtain a reference sample; a subpixel offset value obtaining unit configured to obtain a value of a subpixel offset; and a subpixel 4-tap interpolation filter configured to filter the reference sample to obtain a predicted sample value, wherein filter coefficients of the subpixel 4-tap interpolation filter are defined as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |

-continued

| p | $c_0$ | $c_1$ | $c_2$ | $c_3$ |
|---|---|---|---|---|
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients.

FIG. 25 shows a schematic of the Intra/Inter Processing Module 2500, which comprises a Reference sample obtaining unit 2510, a Subpixel offset value obtaining unit 2520, and a Subpixel interpolation filter 2530.

According to an aspect of the present disclosure, an apparatus is provided for video coding comprising: an intra-prediction processing unit configured to intra-predict a block of a video frame; and a subpixel 4-tap interpolation filter configured to filter a reference sample of the video frame; wherein the subpixel 4-tap interpolation filter is a combination of filters, with filter coefficients of at least one of the filters satisfy:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional sample position of a subpixel offset, and $c_0$, $c_1$, $c_2$, and $c_3$ are the filter coefficients.

FIG. 26 shows a schematic of the Video Coding Module 2600, which comprises an Intra-prediction processing unit 2610 and a Subpixel interpolation filter 2620.

According to an aspect of the present disclosure, an encoder (20) is provided, comprising processing circuitry for carrying out the method according to any one of the previous aspects of the present disclosure.

According to an aspect of the present disclosure, a decoder (30) is provided, comprising processing circuitry for carrying out the method according to any one of the previous aspects of the present disclosure.

According to an aspect of the present disclosure, a computer program product is provided, comprising a program code for performing the method according to any one of the previous aspects of the present disclosure.

According to an aspect of the present disclosure, a decoder is provided, comprising: one or more processors; and a non-transitory computer-readable storage medium coupled to the processors and storing programming for execution by the processors, wherein the programming, when executed by the processors, configures the decoder to carry out the method according to any one of the previous aspects of the present disclosure.

According to an aspect of the present disclosure, an encoder is provided, comprising: one or more processors; and a non-transitory computer-readable storage medium coupled to the processors and storing programming for execution by the processors, wherein the programming, when executed by the processors, configures the encoder to carry out the method according to any one of the previous aspects of the present disclosure.

The present disclosure according to any of the previous aspects may provide an advantage of performing the intra/inter-prediction of a video frame in fast manner. This is because the filter coefficients of the interpolation filter are obtained in an analytical manner, i.e. said coefficients are calculated on-the-fly. This avoids storing the coefficients in a look-up table (LUT), requiring access time to read the coefficients from the memory.

Thus, the prediction becomes more efficient, and requires less demand on memory required. This allows also a low-cost implementation of the prediction. Moreover, since the analytical filter coefficients $\{c_i\}$ are linear in the fractional sample position p, and involve dividing operations by 2, the respective operation may be performed efficiently by employing fast low-level bit operations. The respective time for performing the bit operation and for calculating the filter coefficients is shorter than the time for accessing the stored coefficients from the LUT. Thus, the latency is reduced.

Moreover, the particular analytic structure of the filter coefficients may provide an advantage of a low-complexity implementation of the filter unit(s). Over an above, the filter response (i.e. frequency response) for different subpixel positions is consistent with respect to magnitude and phase and avoids artefacts in the response in particular at high frequencies. The linearity of the filter coefficients may provide an advantage of reusing hardware.

Details of one or more embodiments are set forth in the accompanying drawings and the description below. Other features, objects, and advantages will be apparent from the description, drawings, and claims.

The disclosure can be implemented in hardware and/or software.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

In the following, embodiments of the disclosure are described in more detail with reference to the attached figures and drawings, in which.

Figure 1A:
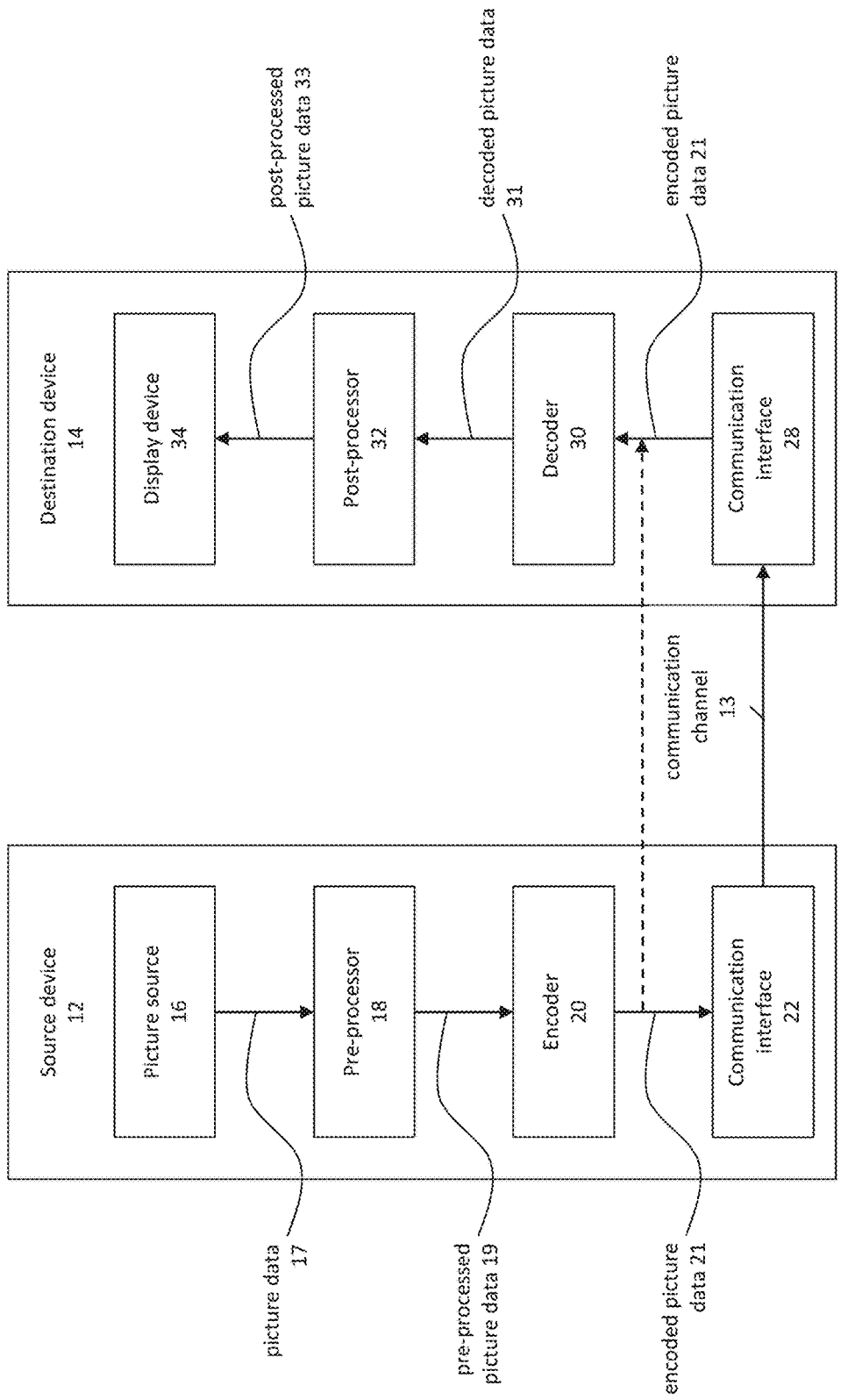
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors , micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof As will be apparent for the skilled person based on the description, the existence and (exact) split of functionalities of the different units or functionalities within the source device 12 and/or destination device 14 as shown in FIG. 1A may vary depending on the actual device and application.

Figure 1B:
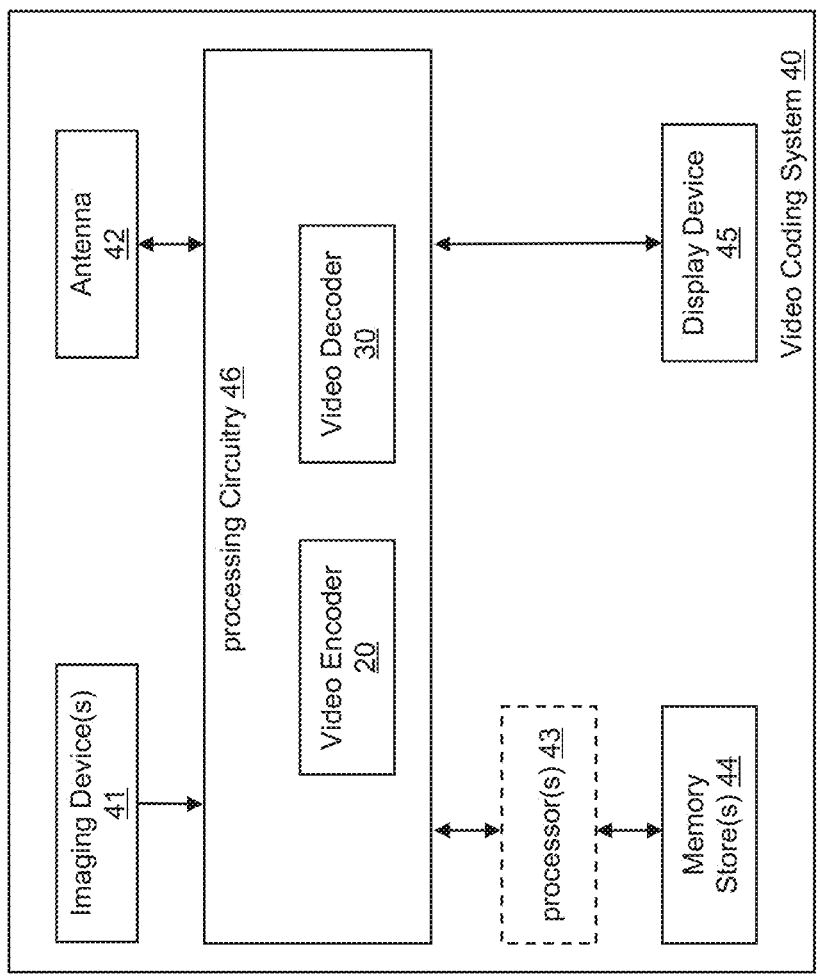
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
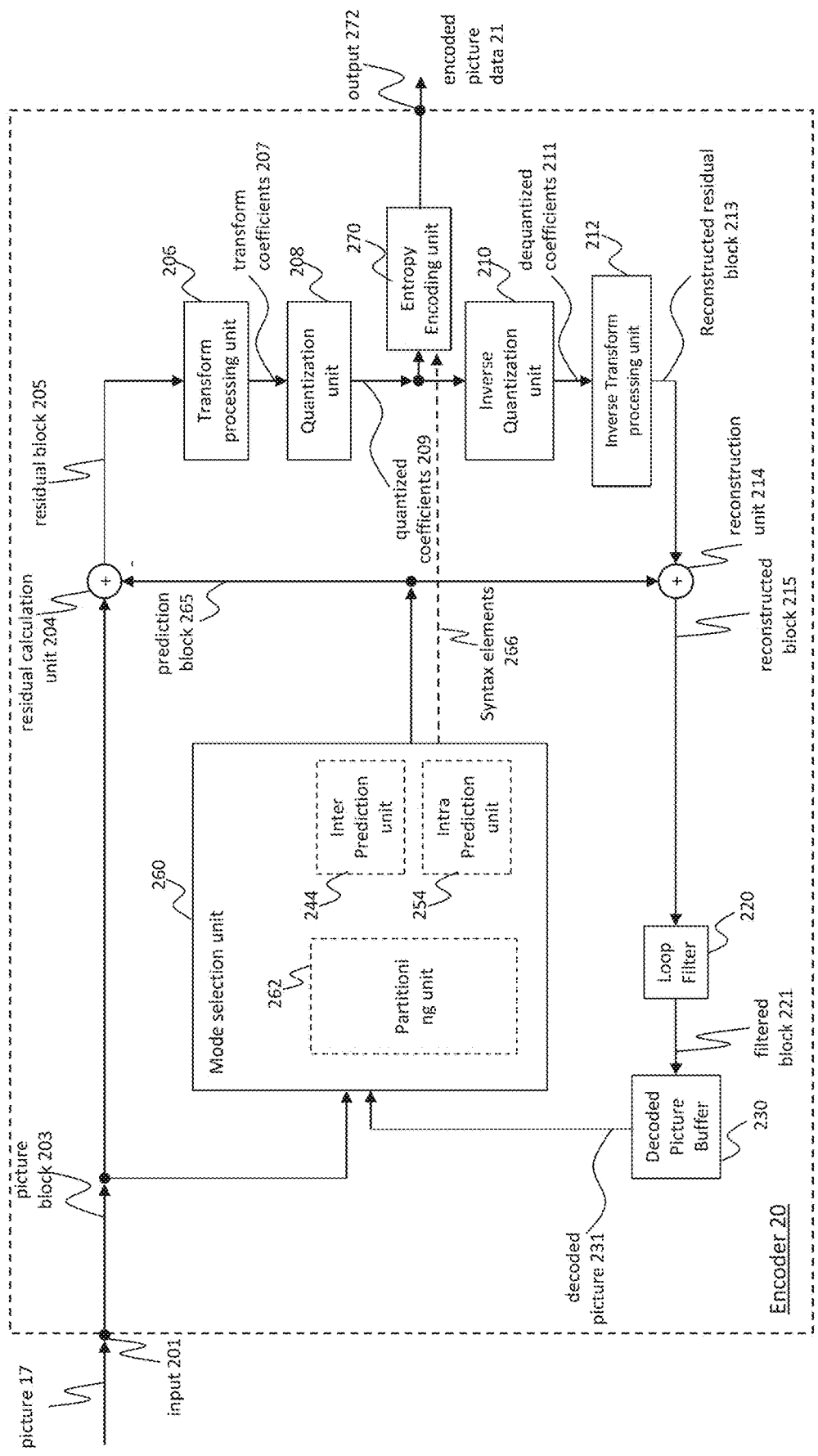
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272).The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
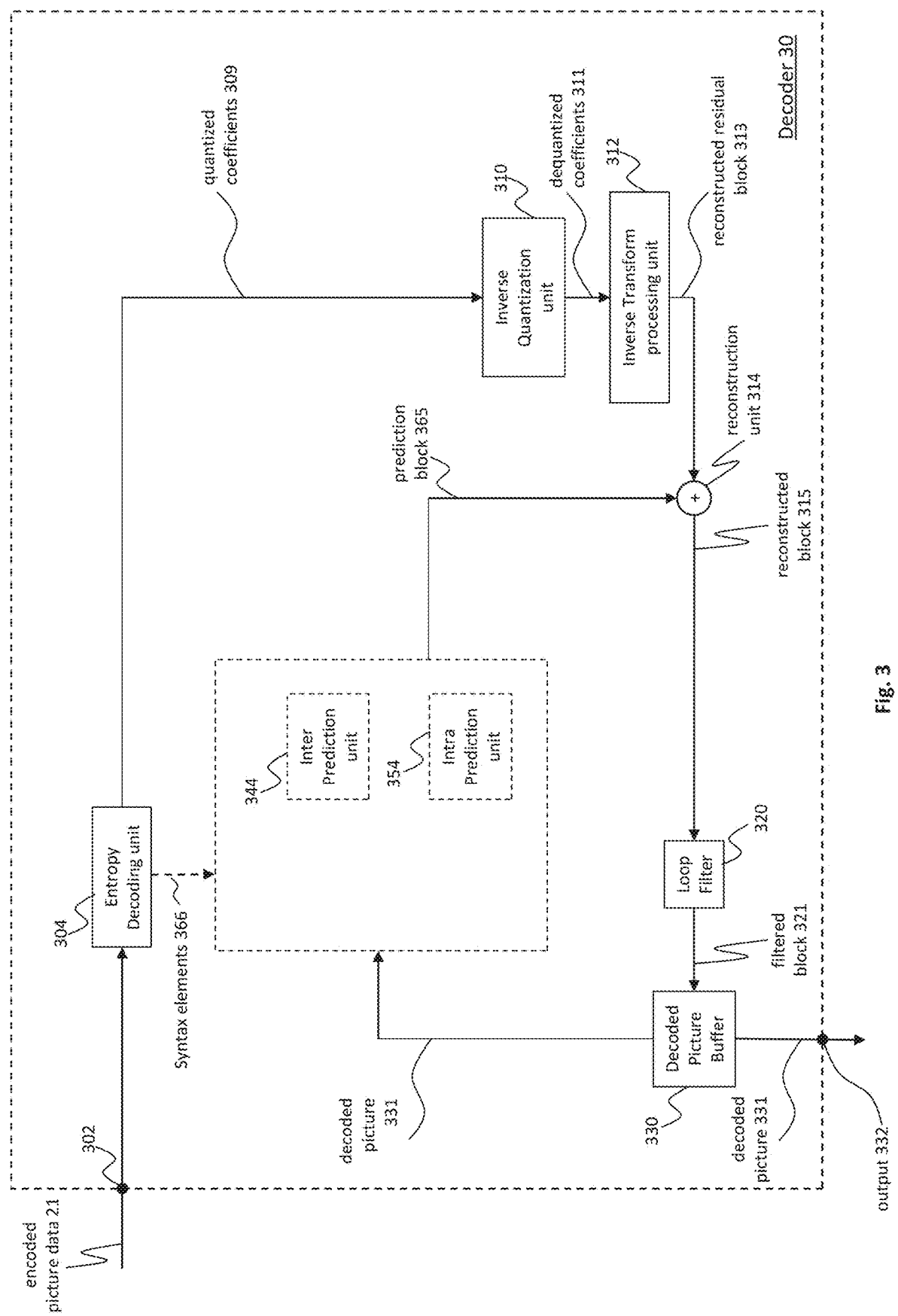
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Bocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Tranform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown).. The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an NxN block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an MxN block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quad-tree structure. The quad-tree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding, . The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% \, 2^{bitDepth} \quad (1)$$

$$mvx = (ux >= 2^{bitDepth-1}) ? (ux - 2^{bitDepth}) : ux \quad (2)$$

$$uy = (mvy + 2^{bitDepth}) \% \, 2^{bitDepth} \quad (3)$$

$$mvy = (uy >= 2^{bitDepth-1}) ? (uy - 2^{bitDepth}) : uy \quad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% \, 2^{bitDepth} \quad (5)$$

$$mvx = (ux >= 2^{bitDepth-1}) ? (ux - 2^{bitDepth}) : ux \quad (6)$$

$$uy = (mvpy + mvdy + 2^{bitDepth}) \% \, 2^{bitDepth} \quad (7)$$

$$mvy = (uy >= 2^{bitDepth-1}) ? (uy - 2^{bitDepth}) : uy \quad (8)$$

The operations may be applied during the sum of mvp and mvd, as shown in formula (5) to (8).

Method 2: remove the overflow MSB by clipping the value $$vx = Clip3(-2^{bitDepth-1}, 2^{bitDepth-1}-1, vx)$$

$$vy = Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
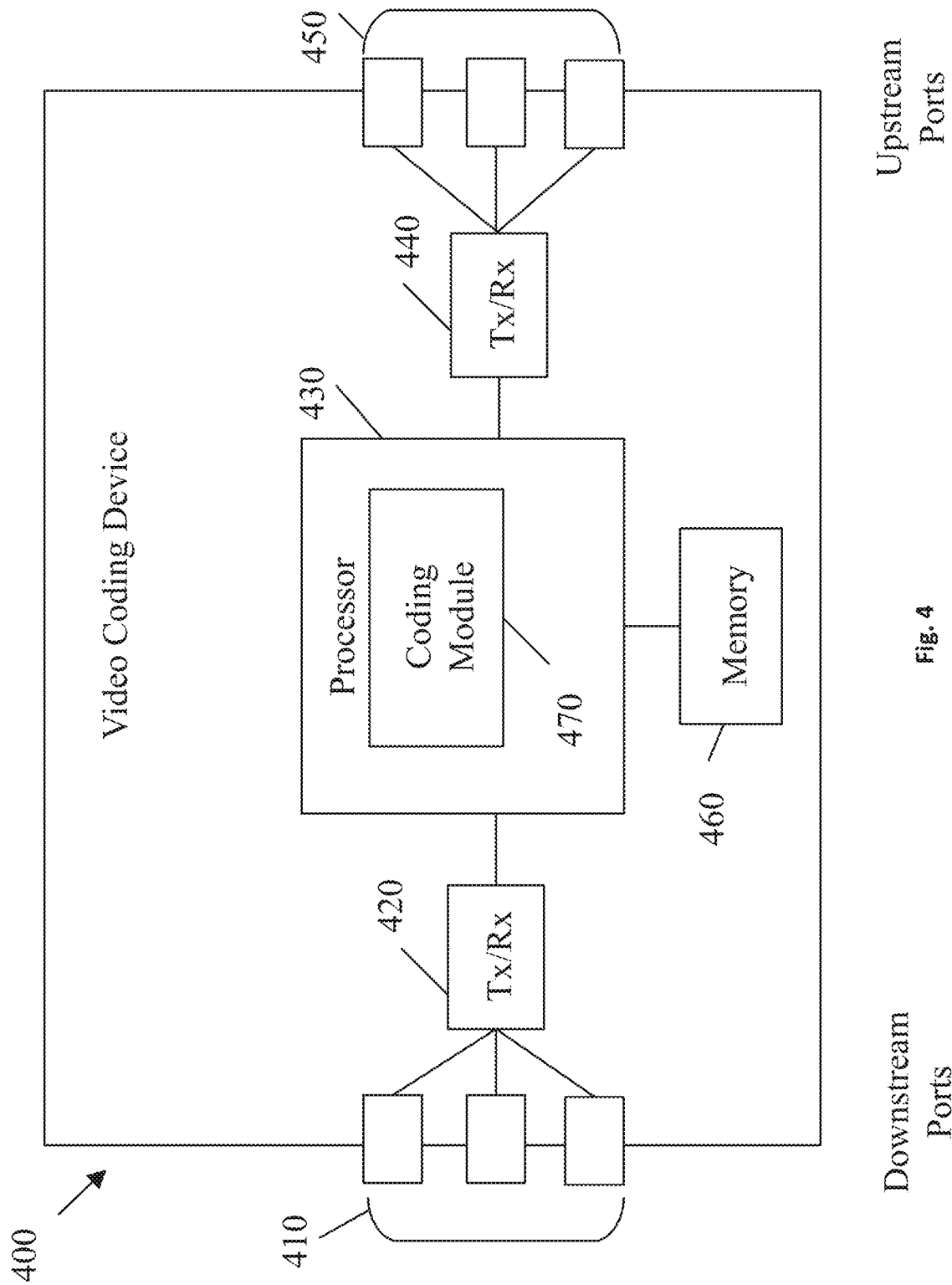
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
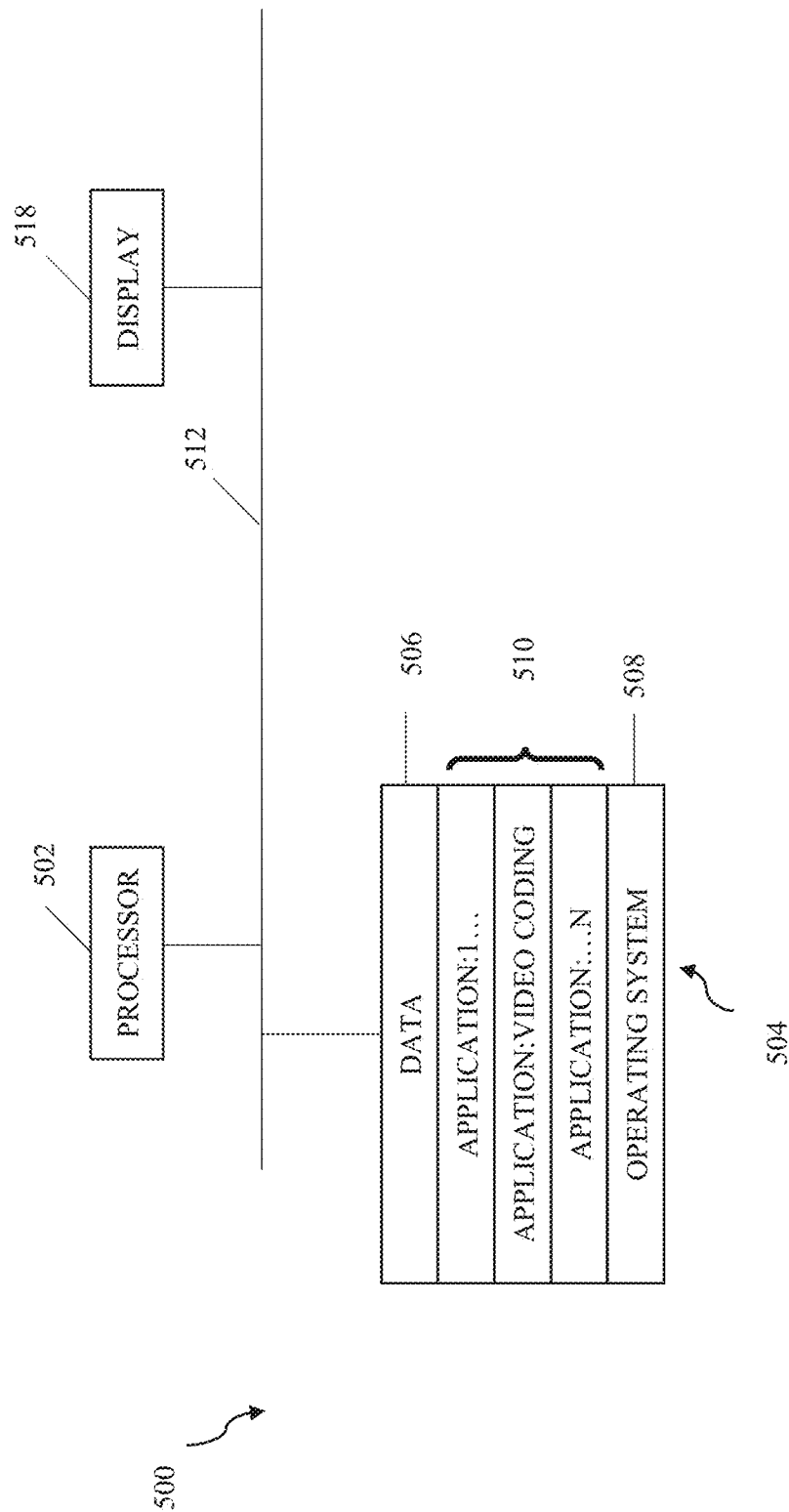
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Figure 6:
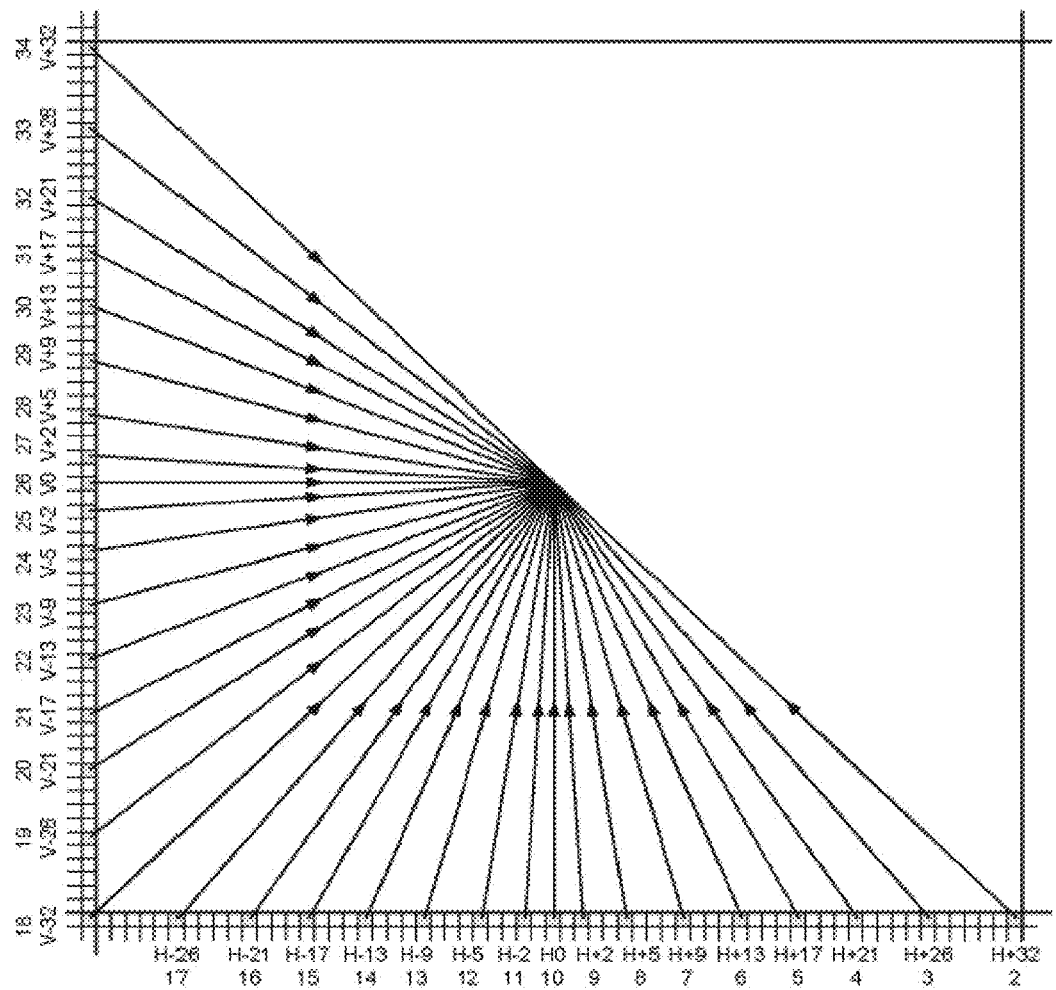
FIG. 6 is a drawing showing angular intra prediction directions and the associated intra-prediction modes in HEVC.

FIG. 6 illustrates a schematic diagram of a plurality of intra prediction modes used in the HEVC UIP scheme. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical xslope derived from the boundary of the block. The DC prediction mode may perform predictions by assuming a flat block surface with a value matching the mean value of the block boundary. The LM prediction mode may perform predictions by assuming a chroma value for the block matches the luma value for the block.

diction mode is greater or equal to diagonal mode, top side of reference samples is selected to be the main reference side and width value is selected to determine interpolation filter in use. Otherwise, main side reference is selected from the left side of the block and height controls the filter selection process. Specifically, if selected side length is smaller than or equal to 8 samples, Cubic interpolation 4 tap is applied. Otherwise, interpolation filter is a 4-tap Gaussian one.

Similar to inter prediction, intra prediction can require interpolation filtering when samples within a block are predicted according to a fractional-slope directional mode. If linear filter is used for this purpose, filter coefficients can be easily calculated if a sample in a block to be predicted falls into a fractional (sub-pel) position within reference samples. So, linear filter does not require a LUT (Look-Up Table) for storing its coefficient. Nevertheless, it can be used rather than direct calculation. However, if a prediction module uses long-tap (e.g., 4- or 8-tap) interpolation filters, it can require a LUT to keep coefficient of interpolation filters like done in inter-prediction module where 8-tap DCT-IF for luma and 4-tap DCT-IF for chroma are tabulated as shown in Table 1 and Table 2, respectively.

TABLE 1

Specification of the luma inter-prediction interpolation filter coefficients $f_L[p]$ for each $1/16$ fractional sample position p.

| Fractional sample position p | interpolation filter coefficients | | | | | | | |
|---|---|---|---|---|---|---|---|---|
| | $f_L$ [p][0] | $f_L$ [p][1] | $f_L$ [p][2] | $f_L$ [p][3] | $f_L$ [p][4] | $f_L$ [p][5] | $f_L$ [p][6] | $f_L$ [p][7] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Figure 7:
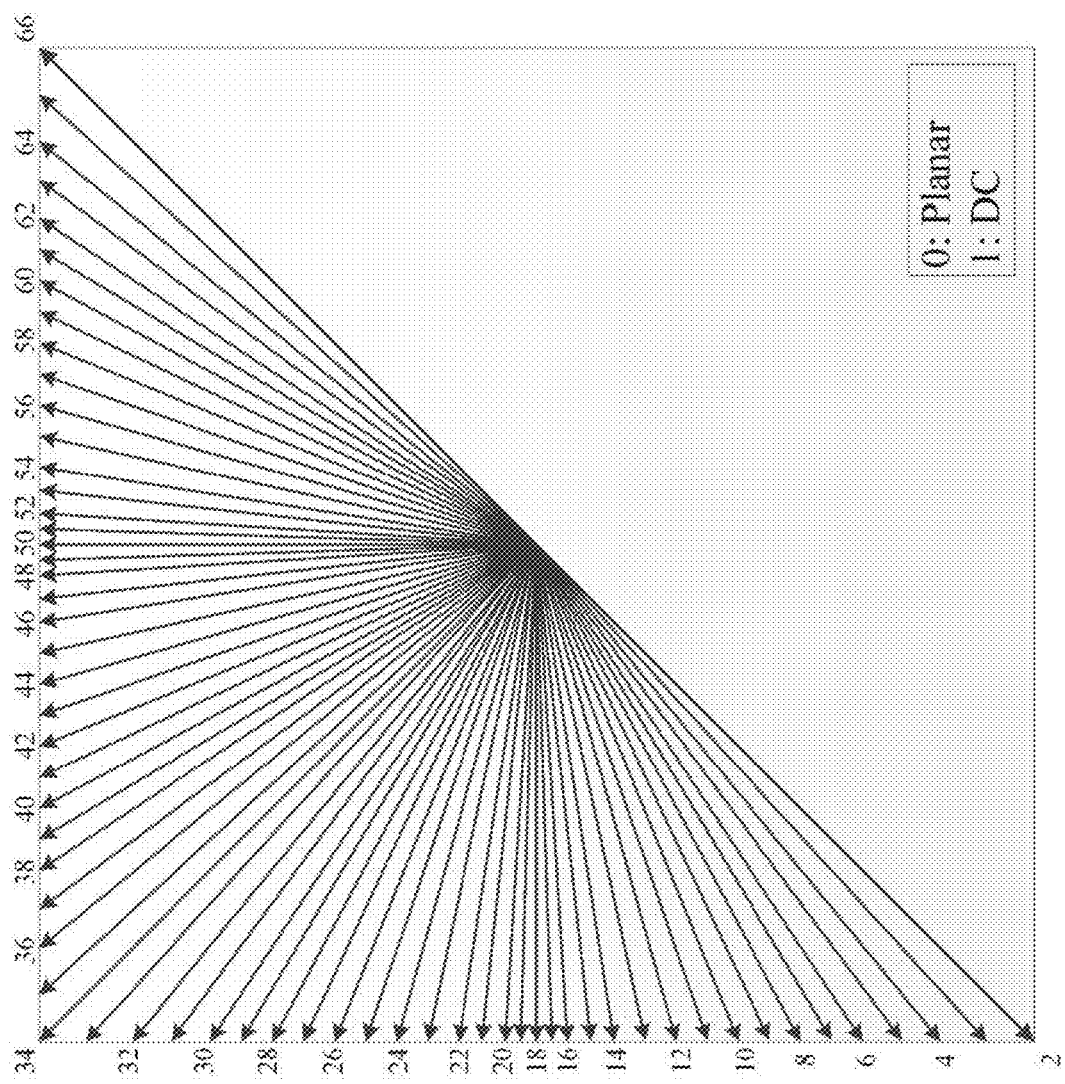
FIG. 7 is a drawing showing angular intra prediction directions and the associated intra-prediction modes in JEM.

FIG. 7 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 7 refers to index 2 and the numbering of the indices being incremented until index 66 being the top right most angular mode of FIG. 7.

Figure 8:
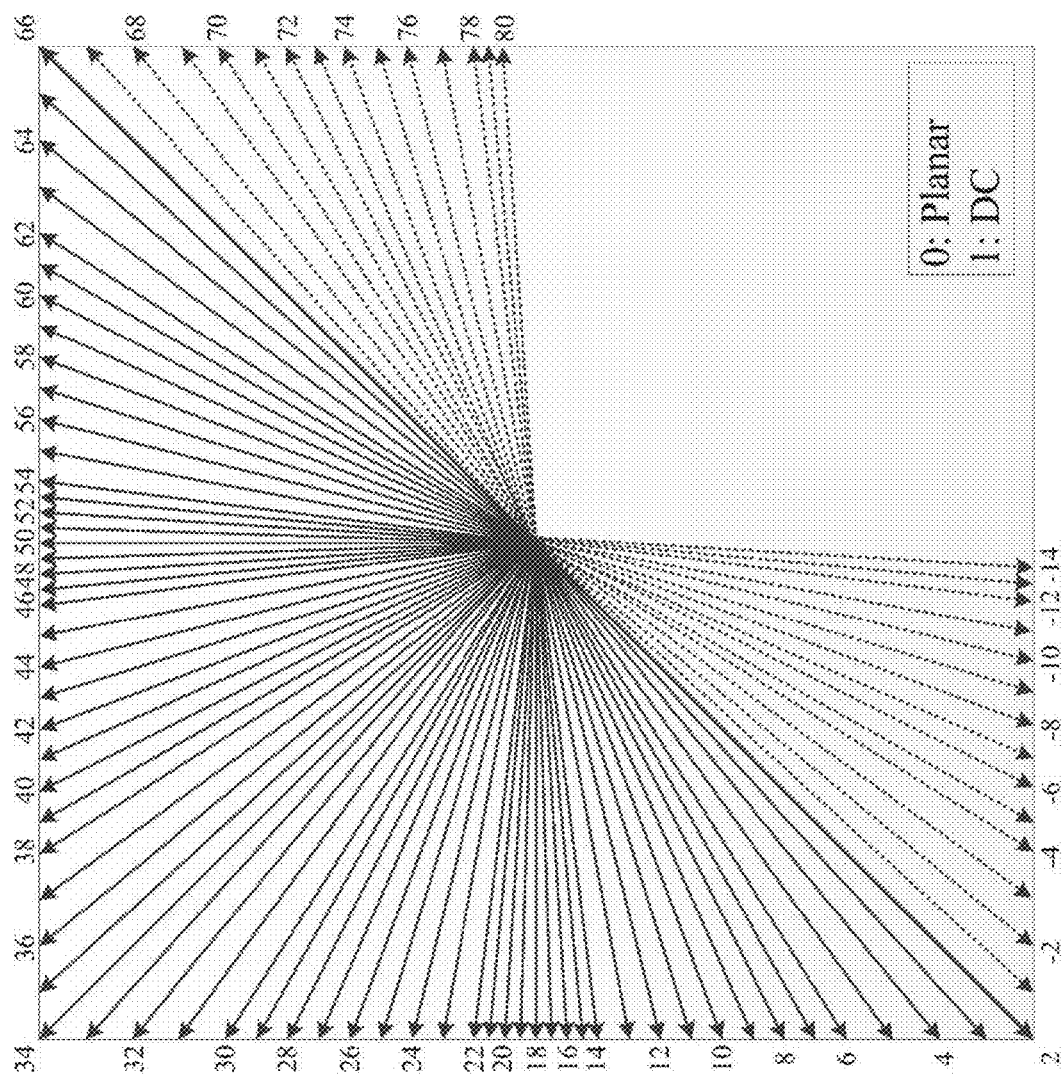
FIG. 8 is a drawing showing angular intra prediction directions and the associated intra-prediction modes in VTM-3.0 and VVC specification draft v.3.

As shown in FIG. 8, starting from the second version VVC has some modes corresponding to skew intra prediction directions, including wide angle ones (shown as dashed lines). For any of these modes, to predict samples within a block interpolation of a set of neighboring reference samples should be performed, if a corresponding position within a block side is fractional. HEVC and VVC uses linear interpolation between two adjacent reference samples. JEM uses more sophisticated 4-tap interpolation filters. Filter coefficients are selected to be either Gaussian or Cubic ones depending on the width or on the height value. Decision on whether to use width or height is harmonized with the decision on main reference side selection: when intra pre-

TABLE 2

Specification of the chroma inter-prediction interpolation filter coefficients $f_C[p]$ for each $1/32$ fractional sample position p.

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |

TABLE 2-continued

Specification of the chroma inter-prediction interpolation filter coefficients $f_C[p]$ for each 1/32 fractional sample position p.

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Particular set of coefficients could be defined as shown in Table 3.

TABLE 3

Specification of intra-prediction interpolation filter coefficients fC and fG as described in the VVC spec draft of version 3.

| Fractional sample position p | fC interpolation filter coefficients | | | | fG interpolation filter coefficients | | | |
|---|---|---|---|---|---|---|---|---|
| | $f_C$ [p][0] | $f_C$ [p][1] | $f_C$ [p][2] | $f_C$ [p][3] | fG [p][0] | fG [p][1] | fG [p][2] | fG [p][3] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

Intra-predicted sample is calculated by convoluting with coefficients defined in accordance with subpixel offset and filter type as follows:

$$s(x) = (\Sigma_{i=0}^{i<4}(\text{"ref"}_{i+x} \cdot c_i) + 32) >> 6.$$

In this equation ">>" indicates a bitwise shift-right operation.

A set of coefficients $\{c_i\}$ is fetched from a lookup-table (LUT). Table 3 gives an example of the values stored in accordance with the current design of VVC described in the spec draft of version 3 (JVET-L1001 "Versatile Video Coding (Draft 3)"). The selection between smoothing (fG) and sharpening (fC) interpolation filters is performed using MDIS (Mode-Dependent Intra Smoothing) conditions. So, either fC or fG can be used to generate predicted samples of a block.

If sharpening filter is selected, predicted sample s(x) is further clipped to the allowed range of values, that is either defined using SPS or derived from the bit depth of the selected component.

For some use-cases, it can be beneficial to avoid keeping explicit LUTs for interpolation filters, since LUT handling requires additional memory and thus increases energy consumption as well as die size. The $1^{st}$ one is critical for mobile applications. The $2^{nd}$ one adversely affects price.

For the mentioned use-cases, it is reasonable to analytically define coefficients of interpolation filters. Instead of performing a fetch from a LUT, filter coefficients could be calculated from the input fractional sample position p.

According to an embodiment of the present disclosure, a method is provided for intra-or inter-prediction processing of a video frame, comprising the operations of: obtaining a reference sample; obtaining a value of a subpixel offset; and filtering, using a subpixel 4-tap interpolation filter, the reference sample to obtain a predicted sample value, wherein filter coefficients of the subpixel 4-tap interpolation filter satisfy:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional part of the value of subpixel offset, and $c_0$, $c_1$, $c_2$, and $c_3$ are the filter coefficients of the subpixel 4-tap interpolation filer.

In one embodiment, the reference samples(s) may be referred to as ref[x], with ref[x]=p[−1−refIdx+x][−1−refIdx], with x=0 . . . nTbW+refIdx+1.

corresponding a an array of reference samples and "p" referring a x-y two-dimensional array p[x][y] containing sample values. The number of reference samples used may be at least one. In another example, the number of reference samples may be four.

In one embodiment, the obtained subpixel offset value may be referred to as (y+1+refIdx)*intraPredAngle with "IntraPredAngle" being the value of an intra-prediction angle.

In one embodiment, the predicted sample value "predSamples[x][y]" may be obtained by predSamples[x][y]=Clip1(((Σ$_{i=0}^{3}$fT[i]*req[x+iIdx+i])+32)>>6)

with fT[i] referring to filter coefficients. These coefficients may be luma- or chroma filter coefficients for the inter-prediction, refered to as fG and fC respectively.

The selection of the filter coeffiients being luma or chroma may be implemented by use and setting of a flag "filterFlag", for example, as fT[j]=filterFlag? fG[iFact][j]: fC[iFact][j]

with iFact=((y+1+refIdx)*intraPredAngle) & 31.

The value "31" refers to the fractional part of the subpixel offset value, and may take other values diferent from "31". The values of the filter coeffients fG (luma) and/or fC (chroma) by be obtained analytically on-the-fly using the above analytical expression for the filter coefficients of the 4-tap filter. Thus, the filter coefficients are defined according to the subpixel offset value.

The filter coefficients are hence obtained without accessing the respecive values of the filter coeficients from a LUT, but rather are obtained by calculation.

Alternatively, the filter coefficients may be calculated usign the above equations, and the values may be stored in a LUT.

According to an embodiment of the present disclosure, the filter coefficients of the subpixel 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 |

According to an embodiment of the present disclosure, a method is provided for intra-or inter-prediction processing of a video frame, comprising the operations of: obtaining a reference sample; obtaining a value of a subpixel offset; and filtering, using a subpixel 4-tap interpolation filter, the reference sample to obtain a predicted sample value, wherein filter coefficients of the subpixel 4-tap interpolation filter are defined as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |

-continued

| p | $c_0$ | $c_1$ | $c_2$ | $c_3$ |
|---|---|---|---|---|
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients.

In one embodiment, the values of the filter coefficients may be stored in a LUT. This means that for the subpixel interpolation filtering the respective values of the filter coefficients are to be fetched from the LUT.

Figure 23:
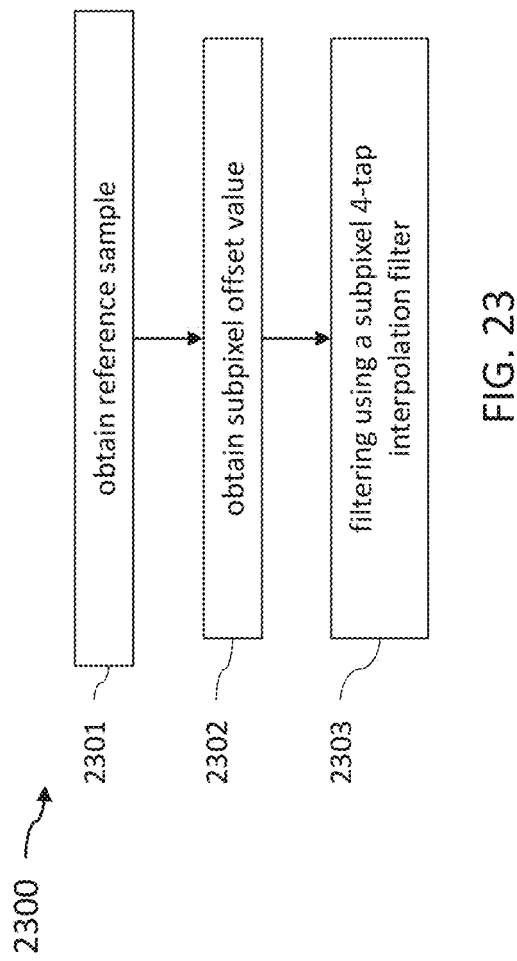
FIG. 23 is a flowchart of the intra/inter-prediction processing.

FIG. 23 shows a flowchart of the intra/inter-prediction processing. In operation 2301, a reference sample is obtained. The reference sample may include one or more reference samples. In operation 2302, a subpixel offset value is then obtained. In operation 2303, the reference sample is then filtered using the subpixel interpolation filter having filter coefficients $\{c_i\}$ with i=0, . . . 3. This is referred to as 4-tap filter and/or 4-point filter.

The filter coefficients may be obtained from analytical expressions with given fractional part p of the subpixel offset value. The filter coefficients may also be obtained from a LUT with reference to p values.

According to an embodiment of the present disclosure, a bit of p is set to zero.

According to an embodiment of the present disclosure, p is incremented by 1 and afterwards a lower bit of the incremented p is set to zero prior said p is used to obtain the filter coefficients.

According to an embodiment of the present disclosure, the obtaining of the filter coefficients comprises the operation of calculating the filter coefficients according to $$c_0 = 16 - \frac{p}{2}$$
$$c_1 = 16 + c_0$$
$$c_2 = c_0 + p$$
$$c_3 = c_0 - p.$$

This may provide an advantage of calculating a filter coefficient $c_{i+1}$ from a previous filter coefficient $c_i$. This may reduce further the time for calculating the filter coefficients.

The proposed disclosure enables both approaches to derive filter coefficients: LUT fetches and direct calculation in accordance with the proposed equations.

One of the features of the interpolation filter consists in a linear dependency of its phase shift on the fractional sample position p. The embodiments of the disclosure utilizes this dependency to get the value of a filter coefficient using simple operations over fractional sample position p.

A linear dependency is used to derive smoothing interpolation filter coefficients fG. Derivation of sharpening interpolation filter coefficients fC is based on taking an absolute value of a linear expression based on p.

According to an embodiment of the present disclosure, a method of video coding is provided, the method comprises intra-prediction processing of a block of a video frame, comprising: filtering, using a subpixel 4-tap interpolation filter, of a reference sample of the video frame; wherein the subpixel 4-tap interpolation filter is a combination of filters, with filter coefficients of at least one of the filters satisfy:

$$c_0 = 16 - \frac{p}{2}$$
$$c_1 = 16 + 16 - \frac{p}{2}$$
$$c_2 = 16 + \frac{p}{2}$$
$$c_3 = \frac{p}{2}$$

wherein p is a fractional sample position of a subpixel offset, and $c_0$, $c_1$, $c_2$, and $c_3$ are the filter coefficients.

Figure 24:
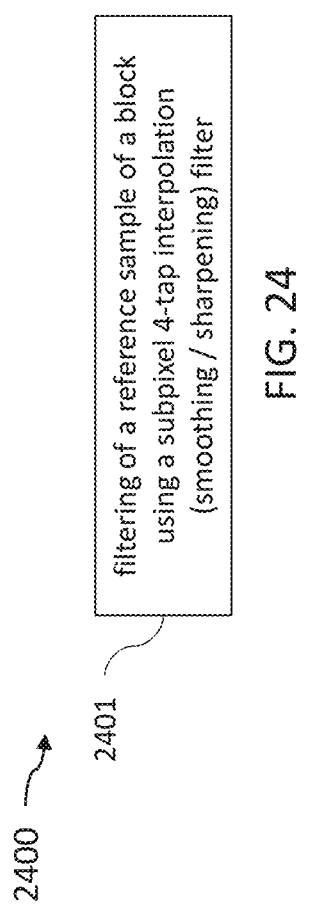
FIG. 24 is a flowchart of the video coding.

FIG. 24 shows a flowchart of the video coding. In operation 2410, intra-prediction processing is performed by filtering of a reference sample of a block, using a subpixel 4-tap interpolation filter.

According to an embodiment of the present disclosure, the subpixel 4-tap interpolation filter is a smoothing filter that is a parallel combination of two phase-dependent linear filters and a low-pass filter.

According to an embodiment of the present disclosure, the subpixel 4-tap interpolation filter is a sharpening filter that is a parallel combination of one phase-dependent linear filter and strength-varying high-pass filter.

According to an embodiment of the present disclosure, the strength-varying high-pass filter is a phase-independent high-pass finite impulse response, FIR, filter, the output of which is multiplied by a phase-dependent strength parameter.

According to any one of the previous embodiments of the present disclosure, a lower bit of p is set to zero.

According to an embodiment of the present disclosure, p is incremented by 1 and afterwards lower bit of the incremented value is set to zero prior this value is used to derive interpolation filter coefficients.

According to an embodiment of the present disclosure, clipping operation is performed for the output of the strength-varying high-pass filter.

The embodiments of the disclosure express the filter coefficient as a combination of two or more FIR (finite impulse response) filters. This combination may comprise the following options:
  sequential combination, i.e. a convolution of the coefficients;
  parallel combination, i.e. weighted sum of the coefficients.

Each of these filters may or may not depend on the phase parameter P which is a function of the fractional sample position p. The coefficients of the filters belonging to the combination have a simple representation from the phase parameter P.

Figure 9:
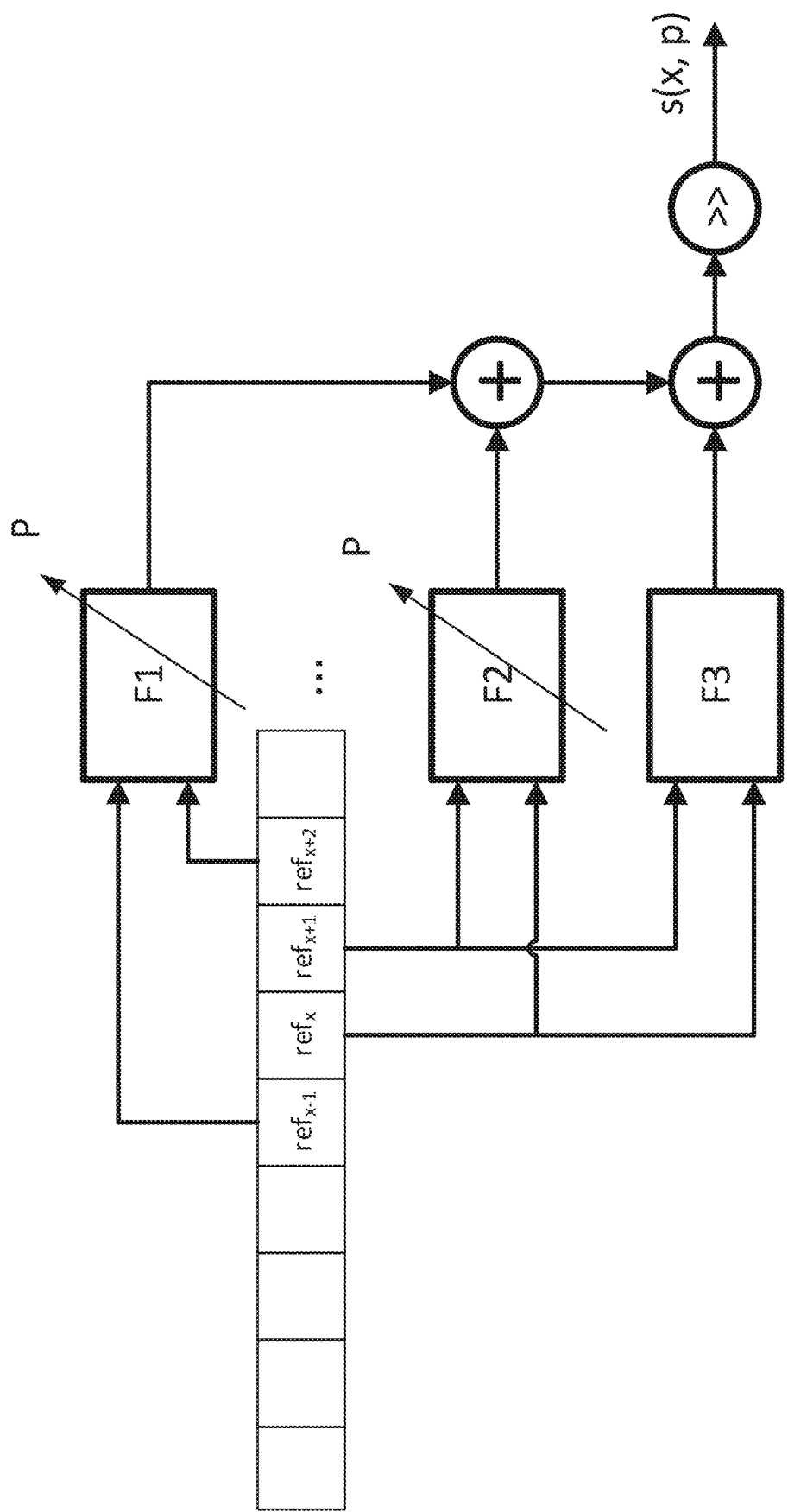
FIG. 9 is a drawing showing an example of a filter combination for smoothing, where a set of reference samples are inputted to the interpolation filter.

In one embodiment, in FIG. 9, a set of reference samples are inputted to the interpolation filter.

In one embodiment, for the case of smoothing interpolation filter, the value of phase parameter P is the same as the value of fractional sample position p. In FIG. 9, blocks F1 and F2 represent linear interpolation filters. The coefficients for each of these filters are expressed from the phase parameter p as follows:

$$c_0 = 16 - \frac{p}{2},$$

$$c_1 = \frac{p}{2}.$$

In an example, here and further, the division operation could be defined with or without rounding, i.e.:

$$\frac{a}{2^n} = a >> n,$$

or $$\frac{a}{2^n} = (a + 2^{n-1}) >> n,$$

wherein "a" is a division nominator and "n" is a power of two parameter of the denominator.

Block F3 represents a two-tap low-pass filter, having constant coefficients:

$c_0 = 16$, $c_1 = 16$.

In an example, filters F1 . . . F3 are non-normalized, F3 have a higher DC gain than F1 and F3 have a higher DC gain than F2.

The output of filters F1 . . . F3 are summed up and normalized. Normalization (block ">>") could be performed, e.g. by a right-shifting, or by division with rounding as described above.

The resulting equation for this combination (equivalent 4-tap filter) is expressed as follows:

$$\begin{cases} c_0 = 16 - \frac{p}{2} \\ c_1 = 16 + 16 - \frac{p}{2} \\ c_2 = 16 + \frac{p}{2} \\ c_3 = \frac{p}{2} \end{cases}$$

This embodiment enables a LUT-based implementation. According to this implementation, the coefficient values could also be defined using a LUT. The values stored in this LUT are defined using Table 4 (for both cases: with and without rounding).

TABLE 4

Specification of intra-prediction interpolation filter coefficient of smoothing filter.

| | With rounding | | | | Without rounding | | | |
|---|---|---|---|---|---|---|---|---|
| p | $c_0$ | $c_1$ | $c_2$ | $c_3$ | $c_0$ | $c_1$ | $c_2$ | $c_3$ |
| 0 | 16 | 32 | 16 | 0 | 16 | 32 | 16 | 0 |
| 1 | 15 | 31 | 17 | 1 | 16 | 32 | 16 | 0 |
| 2 | 15 | 31 | 17 | 1 | 15 | 31 | 17 | 1 |
| 3 | 14 | 30 | 18 | 2 | 15 | 31 | 17 | 1 |
| 4 | 14 | 30 | 18 | 2 | 14 | 30 | 18 | 2 |
| 5 | 13 | 29 | 19 | 3 | 14 | 30 | 18 | 2 |
| 6 | 13 | 29 | 19 | 3 | 13 | 29 | 19 | 3 |

TABLE 4-continued

Specification of intra-prediction interpolation filter coefficient of smoothing filter.

| | With rounding | | | | Without rounding | | | |
|---|---|---|---|---|---|---|---|---|
| p | $c_0$ | $c_1$ | $c_2$ | $c_3$ | $c_0$ | $c_1$ | $c_2$ | $c_3$ |
| 7 | 12 | 28 | 20 | 4 | 13 | 29 | 19 | 3 |
| 8 | 12 | 28 | 20 | 4 | 12 | 28 | 20 | 4 |
| 9 | 11 | 27 | 21 | 5 | 12 | 28 | 20 | 4 |
| 10 | 11 | 27 | 21 | 5 | 11 | 27 | 21 | 5 |
| 11 | 10 | 26 | 22 | 6 | 11 | 27 | 21 | 5 |
| 12 | 10 | 26 | 22 | 6 | 10 | 26 | 22 | 6 |
| 13 | 9 | 25 | 23 | 7 | 10 | 26 | 22 | 6 |
| 14 | 9 | 25 | 23 | 7 | 9 | 25 | 23 | 7 |
| 15 | 8 | 24 | 24 | 8 | 9 | 25 | 23 | 7 |
| 16 | 8 | 24 | 24 | 8 | 8 | 24 | 24 | 8 |
| 17 | 7 | 23 | 25 | 9 | 8 | 24 | 24 | 8 |
| 18 | 7 | 23 | 25 | 9 | 7 | 23 | 25 | 9 |
| 19 | 6 | 22 | 26 | 10 | 7 | 23 | 25 | 9 |
| 20 | 6 | 22 | 26 | 10 | 6 | 22 | 26 | 10 |
| 21 | 5 | 21 | 27 | 11 | 6 | 22 | 26 | 10 |
| 22 | 5 | 21 | 27 | 11 | 5 | 21 | 27 | 11 |
| 23 | 4 | 20 | 28 | 12 | 5 | 21 | 27 | 11 |
| 24 | 4 | 20 | 28 | 12 | 4 | 20 | 28 | 12 |
| 25 | 3 | 19 | 29 | 13 | 4 | 20 | 28 | 12 |
| 26 | 3 | 19 | 29 | 13 | 3 | 19 | 29 | 13 |
| 27 | 2 | 18 | 30 | 14 | 3 | 19 | 29 | 13 |
| 28 | 2 | 18 | 30 | 14 | 2 | 18 | 30 | 14 |
| 29 | 1 | 17 | 31 | 15 | 2 | 18 | 30 | 14 |
| 30 | 1 | 17 | 31 | 15 | 1 | 17 | 31 | 15 |
| 31 | 0 | 16 | 32 | 16 | 1 | 17 | 31 | 15 |

From Table 4 it could be noticed that the coefficients are within a range of [0, 31]. This fact explains the technical benefit of the disclosure that consists in the possibility to use 16-bit multipliers for the 8-bit and 10-bit pictures that are used and will be used, at least, in the mid-term perspective most frequently. A typical implementation of the disclosure would comprise four parallel multiplication operations, wherein the operands of multiplication have bit depths of, at maximum, 6 for filter coefficients and 10 for samples. The result of the multiplication would not exceed a 16-bit value, thus making the proposed coefficients friendly from implementation point of view.

In inter-prediction mode, a block motion compensation is performed. Motion compensation might comprise a operation of interpolation filtering, which is similar to intra-interpolation filtering. Another beneficial property of the disclosure is that the coefficients of interpolation filters have the same precision (i.e. the bit-depth of the coefficients' values is the same) for both intra- and inter-prediction modes. If the precision of interpolation filter coefficients is higher in intra prediction case, it can adversely affect the computational complexity of a video codec. The reason is that intra-prediction is inherently sequential as it requires reconstructed samples of previous blocks. In contrast, inter-prediction can be carried out in parallel. Hence, if the precision of interpolation is higher for intra-prediction than for inter, that can deepen the implementation misbalance between intra- and inter-prediction pipelines. This alignment of precision enables to avoid such negative consequences.

Another benefit of the proposed disclosure is in reduction of the diversity of the coefficients. Considering that pairs of neighboring rows of Table 4 are identical, a practical implementation of the disclosure would fetch from a LUT that have just 16 rows (the rows corresponding to even values of p in the "Without rounding" case, and the rows corresponding to odd values of p in the "With rounding" case) instead of 32 rows.

A technical effect of the disclosure is that it enables, at least, the following types of implementations:

- LUT-free implementations that compute filter coefficients using values of p, wherein the computation is based on the analytical equations described above; and
- LUT-based implementations that fetch filter coefficients from a LUT using an index value based on a value of p.

The precision of the value of p is reduced when computing the values of the coefficients. In particular, the value of coefficients are derived based on the result of the integer division by 2, i.e. p/2 that can be implemented as a right shift by 1, which is simply implementable in hardware. For LUT-based implementations, this precision reduction results in the reduction of the memory required to store the LUT. In hardware, this would also reduce the number of wires of an address bus of the LUT.

According to an embodiment of the present disclosure, an apparatus is provided for intra- or inter-prediction processing of a video frame, including: a reference sample obtaining unit configured to obtain a reference sample; a subpixel offset value obtaining unit configured to obtain a value of a subpixel offset; and a subpixel 4-tap interpolation filter configured to filter the reference sample to obtain a predicted sample value, wherein filter coefficients of the subpixel 4-tap interpolation filter satisfy:

$$c_0 = 16 - \frac{p}{2}$$
$$c_1 = 16 + 16 - \frac{p}{2}$$
$$c_2 = 16 + \frac{p}{2}$$
$$c_3 = \frac{p}{2}$$

wherein p is a fractional part of the value of the subpixel offset, and $c_0$, $c_1$, $c_2$, and $c_3$ are the filter coefficients of the subpixel 4-tap interpolation filter.

According to an embodiment of the present disclosure, the filter coefficients of the subpixel 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 |

According to an embodiment of the present disclosure, an apparatus is provided for intra- or inter-prediction processing of a video frame, comprising: a reference sample obtaining unit configured to obtain a reference sample; a subpixel offset value obtaining unit configured to obtain a value of a subpixel offset; and a subpixel 4-tap interpolation filter configured to filter the reference sample to obtain a predicted sample value, wherein filter coefficients of the subpixel 4-tap interpolation filter are defined as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients.

Figure 25:
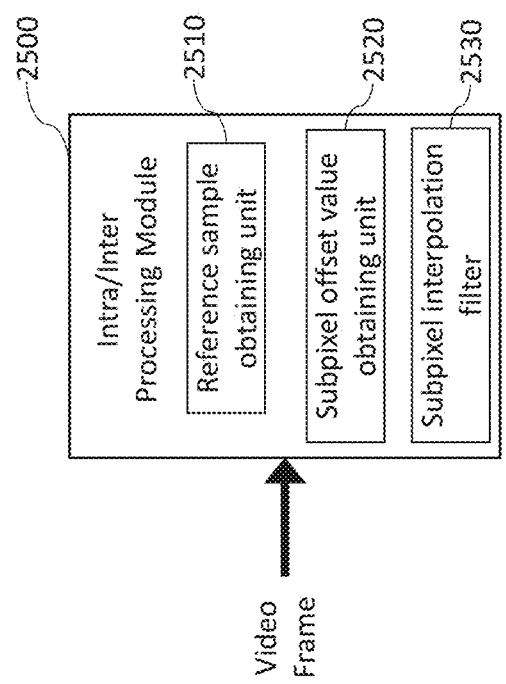
FIG. 25 is a block diagram of the intra/inter-prediction processing module, including a reference sample obtaining unit, a subpixel offset value obtaining unit, and a subpixel interpolation filter.

FIG. 25 shows a schematic of the Intra/Inter Processing Module 2500, which comprises a Reference sample obtaining unit 2510, a Subpixel offset value obtaining unit 2520, and a Subpixel interpolation filter 2530.

According to an embodiment of the present disclosure, an apparatus is provided for video coding comprising: an intra-prediction processing unit configured to intra-predict a block of a video frame; and a subpixel 4-tap interpolation filter configured to filter a reference sample of the video frame; wherein the subpixel 4-tap interpolation filter is a combination of filters, with filter coefficients of at least one of the filters satisfy:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional sample position of a subpixel offset, and $c_0$, $c_1$, $c_2$, and $c_3$ are the filter coefficients.

Figure 26:
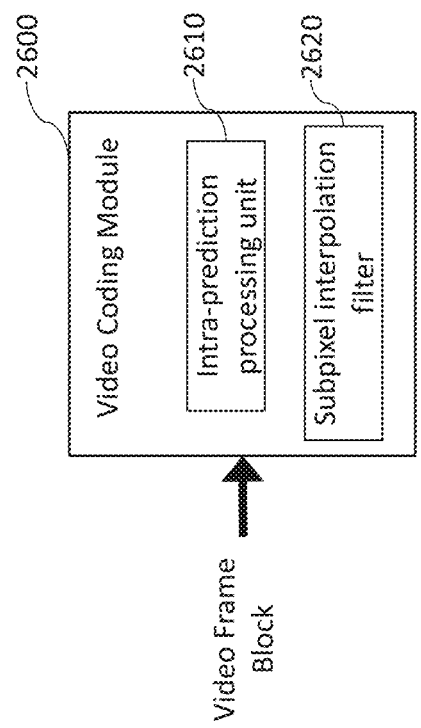
FIG. 26 is a block diagram of the video coding module, including an inter-prediction processing unit and a subpixel interpolation filter.

FIG. 26 shows a schematic of the Video Coding Module 2600, which comprises an Intra-prediction processing unit 2610 and a Subpixel interpolation filter 2620.

According to an embodiment of the present disclosure, an encoder (20) is provided, comprising processing circuitry for carrying out the method according to any one of the previous embodiments of the present disclosure.

According to an embodiment of the present disclosure, a decoder (30) is provided, comprising processing circuitry for carrying out the method according to any one of the previous embodiments of the present disclosure.

According to an embodiment of the present disclosure, a computer program product is provided, comprising a program code for performing the method according to any one of the previous embodiments of the present disclosure.

According to an embodiment of the present disclosure, a decoder is provided, comprising: one or more processors; and a non-transitory computer-readable storage medium coupled to the processors and storing programming for execution by the processors, wherein the programming, when executed by the processors, configures the decoder to carry out the method according to any one of the previous embodiments of the present disclosure.

According to an embodiment of the present disclosure, an encoder is provided, comprising: one or more processors; and a non-transitory computer-readable storage medium coupled to the processors and storing programming for execution by the processors, wherein the programming, when executed by the processors, configures the encoder to carry out the method according to any one of the previous embodiments of the present disclosure.

The present disclosure according to any of the previous embodiments may provide an advantage of performing the intra/inter-prediction of a video frame in fast manner. This is because the filter coefficients of the interpolation filter are obtained in an analytical manner, i.e. said coefficients are calculated on-the-fly. This avoids storing the coefficients in a look-up table (LUT), requiring access time to read the coefficients from the memory.

Thus, the prediction becomes more efficient, and requires less demand on memory required. This allows also a low-cost implementation of the prediction. Moreover, since the analytical filter coefficients $\{c_i\}$ are linear in the fractional sample position p, and involve dividing operations by 2, the respective operation may be performed efficiently by employing fast low-level bit operations. The respective time for performing the bit operation and for calculating the filter coefficients is shorter than the time for accessing the stored coefficients from the LUT. Thus, the latency is reduced.

Moreover, the particular analytic structure of the filter coefficients may provide an advantage of a low-complexity implementation of the filter unit(s). Over an above, the filter response (i.e. frequency response) for different subpixel positions is consistent with respect to magnitude and phase and avoids artefacts in the response in particular at high frequencies. The linearity of the filter coefficients may provide an advantage of reusing hardware.

In one embodiment, for the case of sharpening interpolation filter, a strength parameter S is defined as follows:

$$S = \frac{48 - |3p - 48|}{8}.$$

Figure 10:
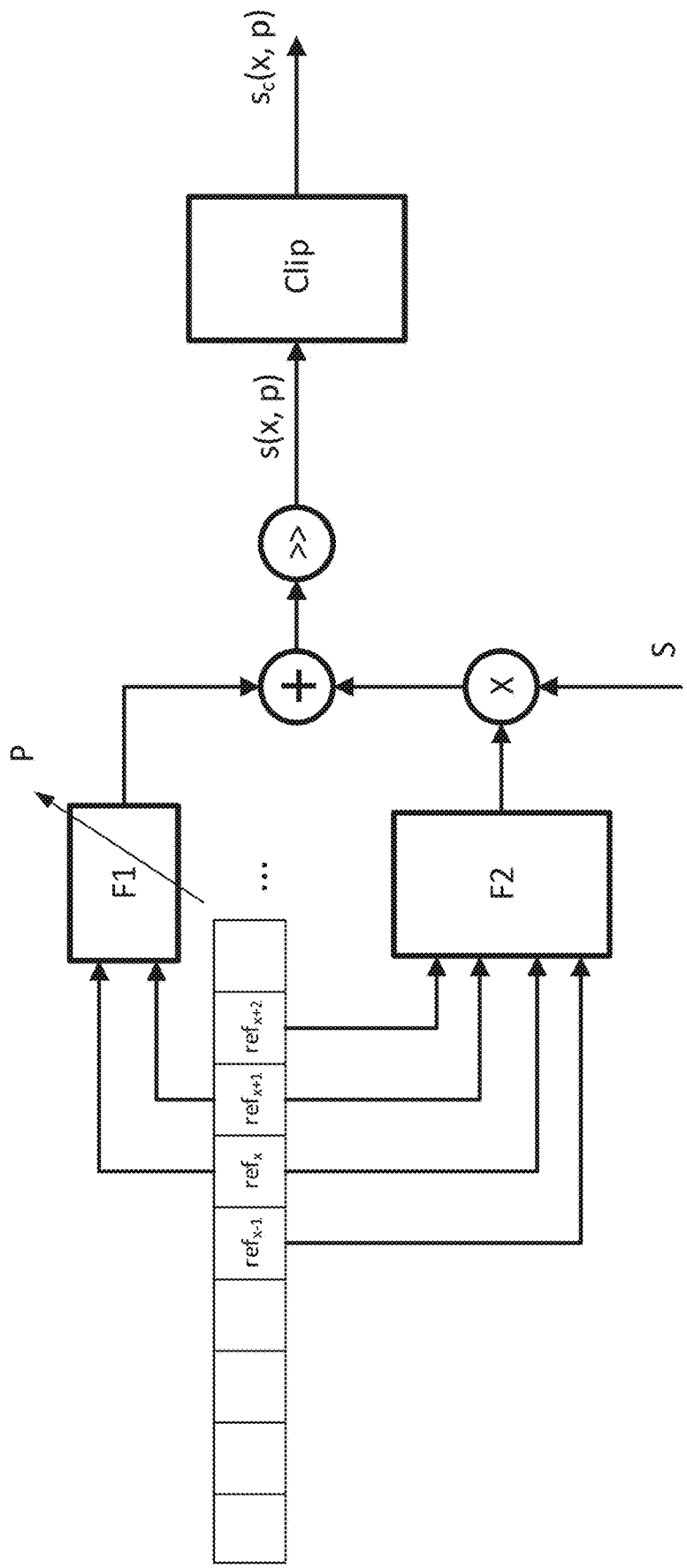
FIG. 10 is a drawing showing an exemplary combination of filters for sharpening interpolation filtering, including clipping operation.

This strength parameter S is defined to have a maximum value at the half-pel position (p=16). For the subpixel positions close to integer ones, strength parameter S has a lower value. An exemplary combination of filters is shown in FIG. 10. Block F1 in this figure represents a linear filter, with its coefficients defined as follows:

$c_0 = 64 - (p << 1)$, $c_1 = << 1$.

Block F2 represents a high-pass filter having the following coefficients:

$c_0 = -1$ $c_1 = 1$ $c_2 = 1$ $c_3 = -1$

The output of block F2 is being multiplied by a strength parameter S. The result of the multiplication is further summed up with the output of linear filter F1, and the resulting sum is normalized.

The resulting equation for this combination (equivalent 4-tap filter) is expressed as follows:

$c_0 = -S$ $c_1 = 64 - (p << 1) + S$ $c_2 = (p << 1) + S$ $c_3 = -S$

For this equation, a LUT-based implementation is also possible. Table 5 gives the values of the coefficients.

TABLE 5

Specification of intra-prediction interpolation filter coefficient of sharpening filter

| p | $c_0$ | $c_1$ | $c_2$ | $c_3$ |
|---|---|---|---|---|
| 0 | 0 | 64 | 0 | 0 |
| 1 | 0 | 62 | 2 | 0 |
| 2 | 0 | 60 | 4 | 0 |
| 3 | −1 | 59 | 7 | −1 |
| 4 | −1 | 57 | 9 | −1 |
| 5 | −1 | 55 | 11 | −1 |
| 6 | −2 | 54 | 14 | −2 |
| 7 | −2 | 52 | 16 | −2 |
| 8 | −3 | 51 | 19 | −3 |
| 9 | −3 | 49 | 21 | −3 |
| 10 | −3 | 47 | 23 | −3 |
| 11 | −4 | 46 | 26 | −4 |
| 12 | −4 | 44 | 28 | −4 |
| 13 | −4 | 42 | 30 | −4 |
| 14 | −5 | 41 | 33 | −5 |
| 15 | −5 | 39 | 35 | −5 |
| 16 | −6 | 38 | 38 | −6 |
| 17 | −5 | 35 | 39 | −5 |

TABLE 5-continued

Specification of intra-prediction interpolation filter coefficient of sharpening filter

| p | $c_0$ | $c_1$ | $c_2$ | $c_3$ |
|---|---|---|---|---|
| 18 | −5 | 33 | 41 | −5 |
| 19 | −4 | 30 | 42 | −4 |
| 20 | −4 | 28 | 44 | −4 |
| 21 | −4 | 26 | 46 | −4 |
| 22 | −3 | 23 | 47 | −3 |
| 23 | −3 | 21 | 49 | −3 |
| 24 | −3 | 19 | 51 | −3 |
| 25 | −2 | 16 | 52 | −2 |
| 26 | −2 | 14 | 54 | −2 |
| 27 | −1 | 11 | 55 | −1 |
| 28 | −1 | 9 | 57 | −1 |
| 29 | −1 | 7 | 59 | −1 |
| 30 | 0 | 4 | 60 | 0 |
| 31 | 0 | 2 | 62 | 0 |

As filter F2 has negative coefficients, the normalized result is further clipped to fit in the range of allowed values that could be either signaled in the SPS or derived from the samples' bit depth.

Figure 11:
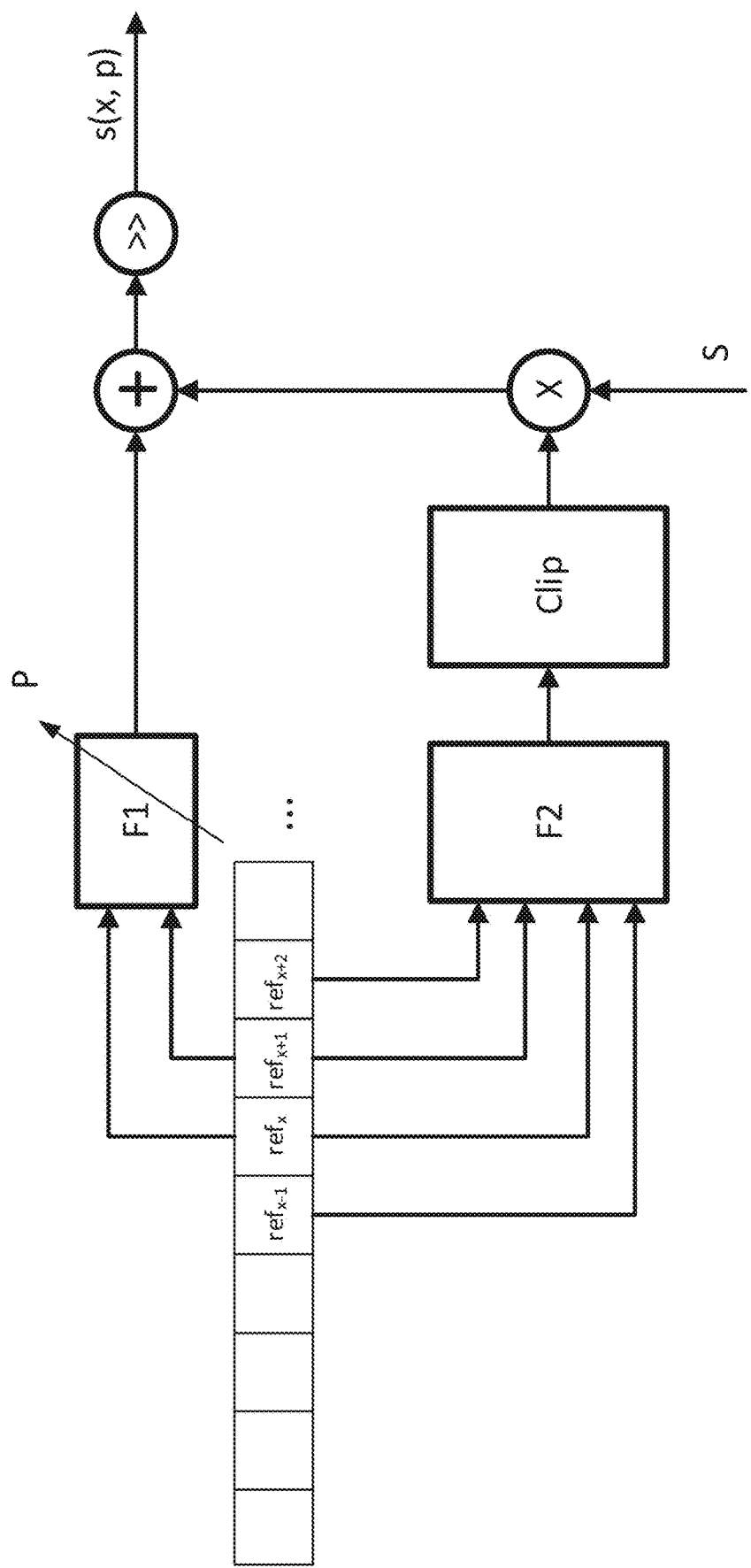
FIG. 11 is a drawing showing an exemplary combination of filters for sharpening interpolation filtering, with an alternative position of the clipping operation.

An alternative embodiment is to specify alternative position of the clipping operation (see FIG. 11). This alternative design is based on that linear filter Fl may not have an output value that is lower or higher than any of its input values.

In one embodiment, Clipping block operates using the following operations.

Operation one is to determine to perform minimum thresholding or maximum thresholding.

Operation two depends on the result of operation one. Specifically, either minimum or maximum thresholding is performed.

Minimum thresholding is applied in case when the input to the clipping block is negative. Otherwise, maximum thresholding is applied. The output $v_c$ of operation two (and of the clipping block) could be defined as follows:

$$v_c = \begin{cases} v < 0, & v_{cmin} \\ \text{otherwise}, & v_{cmax} \end{cases}.$$

For an input value v, the output of minimum thresholding $v_{cmin}$ is calculated as follows:

$$v_{cmin} = -\min\left(-v, \frac{\min\,(ref_x, ref_{x-1})}{S}\right).$$

The output of maximum thresholding is calculated as follows:

$$v_{cmax} = \min\left(v, \frac{p_{max} - \max\,(ref_x, ref_{x-1})}{S}\right),$$

wherein $p_{max}$ is the maximum value of the range of allowed value of the sample.

Values $ref_x$ and $ref_{x-1}$ are input reference samples shown in FIG. 11, that are an input of the linear filter F1.

In one embodiment, in case clipping is performed after multiplication operation, $v_c$ is calculated as follows:

$$v_c = \begin{cases} v < 0, & -\min(-v, \min(ref_x, ref_{x-1})) \\ \text{otherwise}, & \min(v, p_{max} - \max(ref_x, ref_{x-1})) \end{cases}.$$

In some embodiments, filter F3 in FIG. 9, filter F2 in FIG. 10 and FIG. 11 may not depend on the phase parameter P. These embodiments simplifies implementation as output of these filters may be same for each input row of predicted samples, thus this operation could be performed before starting interpolation process, e.g. at the stage of reference sample filtering process. This approach increases parallelism and thus reduces latency of directional filtering.

Figure 12A:
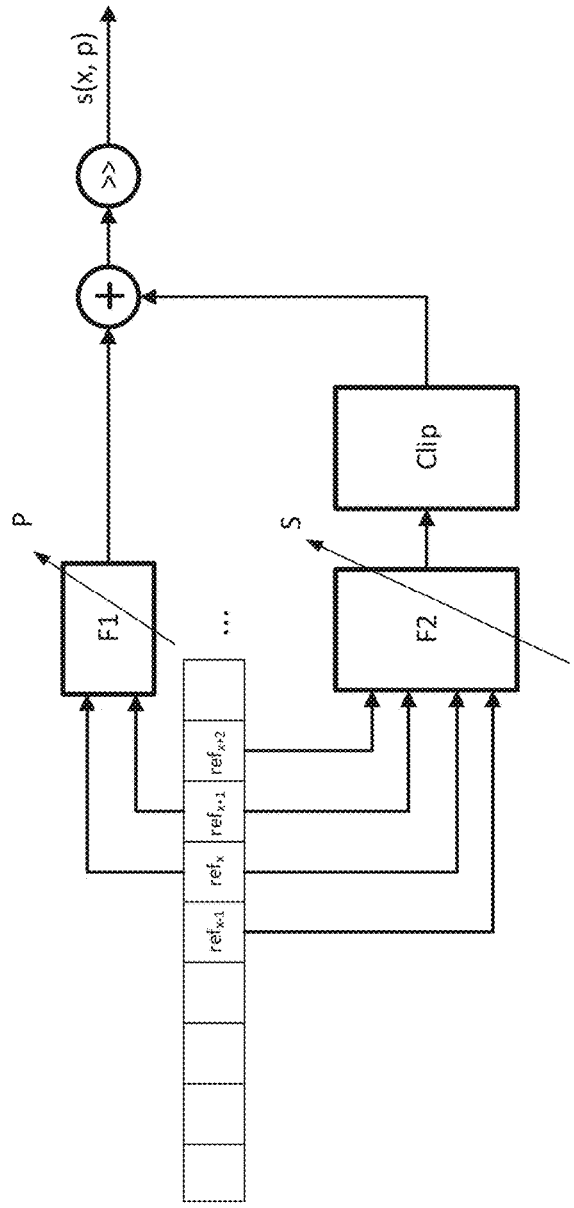
FIG. 12A is a drawing showing an exemplary combination of filters for sharpening interpolation filtering, using filter of adjustable strength.
Figure 12B:
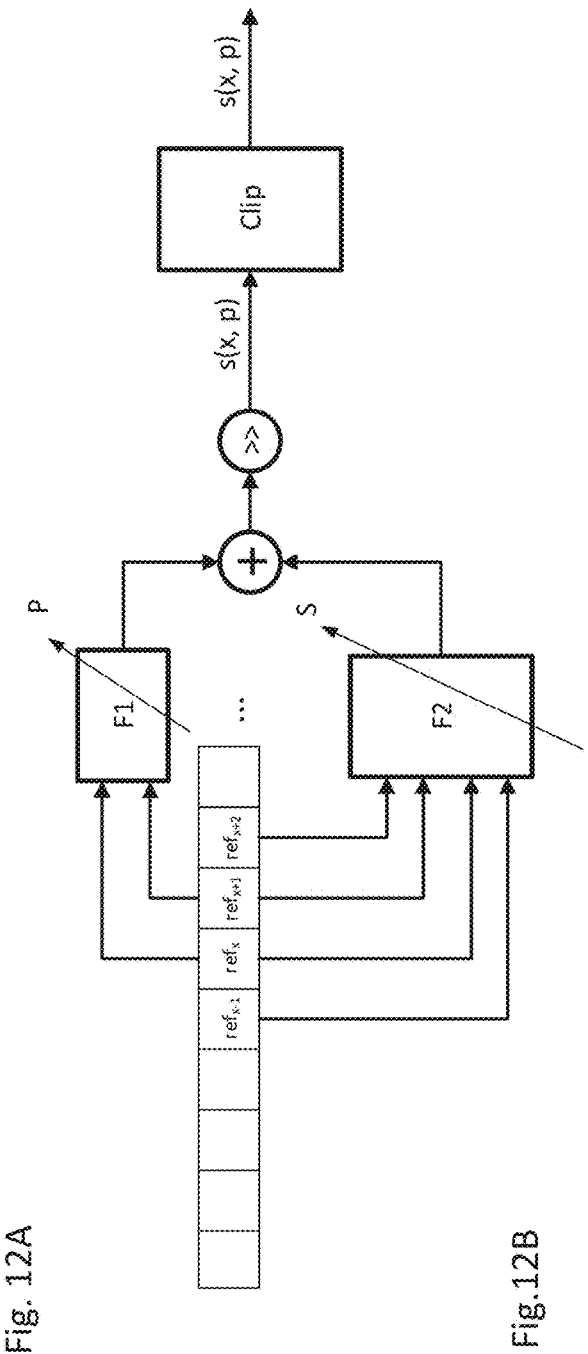
FIG. 12B is a drawing showing another exemplary combination of filters for sharpening interpolation filtering, using filter of adjustable strength.
Figure 13:
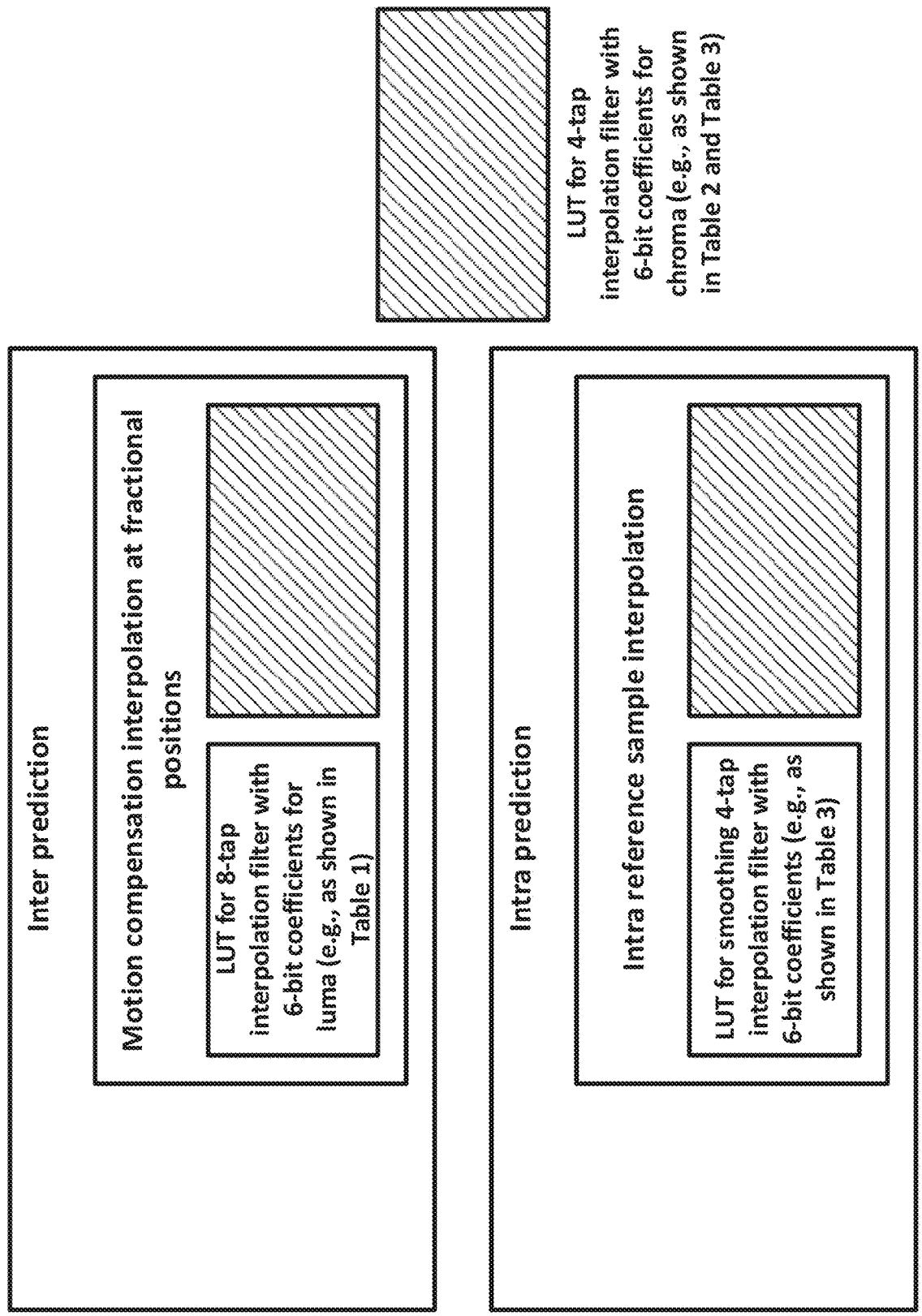
FIGS. 13-21 are drawings showing different combinations of LUT-based and analytic representations of interpolation filter coefficients.

Another alternative embodiment (see FIG. 12) uses filter of adjustable strength, not just multiplier of the filter output. FIG. 12A shows the case when clipping is performed for the output of the high-pass filter F2. FIG. 12B shows the case when clipping is performed for the output of the normalized output of the combination of F1 and F2. Example of filters of adjustable strength could be as follows: bilateral filter, inverse transform filter, etc.

Another embodiment uses reduced resolution of p, i.e. only 16 out of 32 entries is used. This is achieved by, e.g. setting least significant bit of p to zero.

Figure 14:
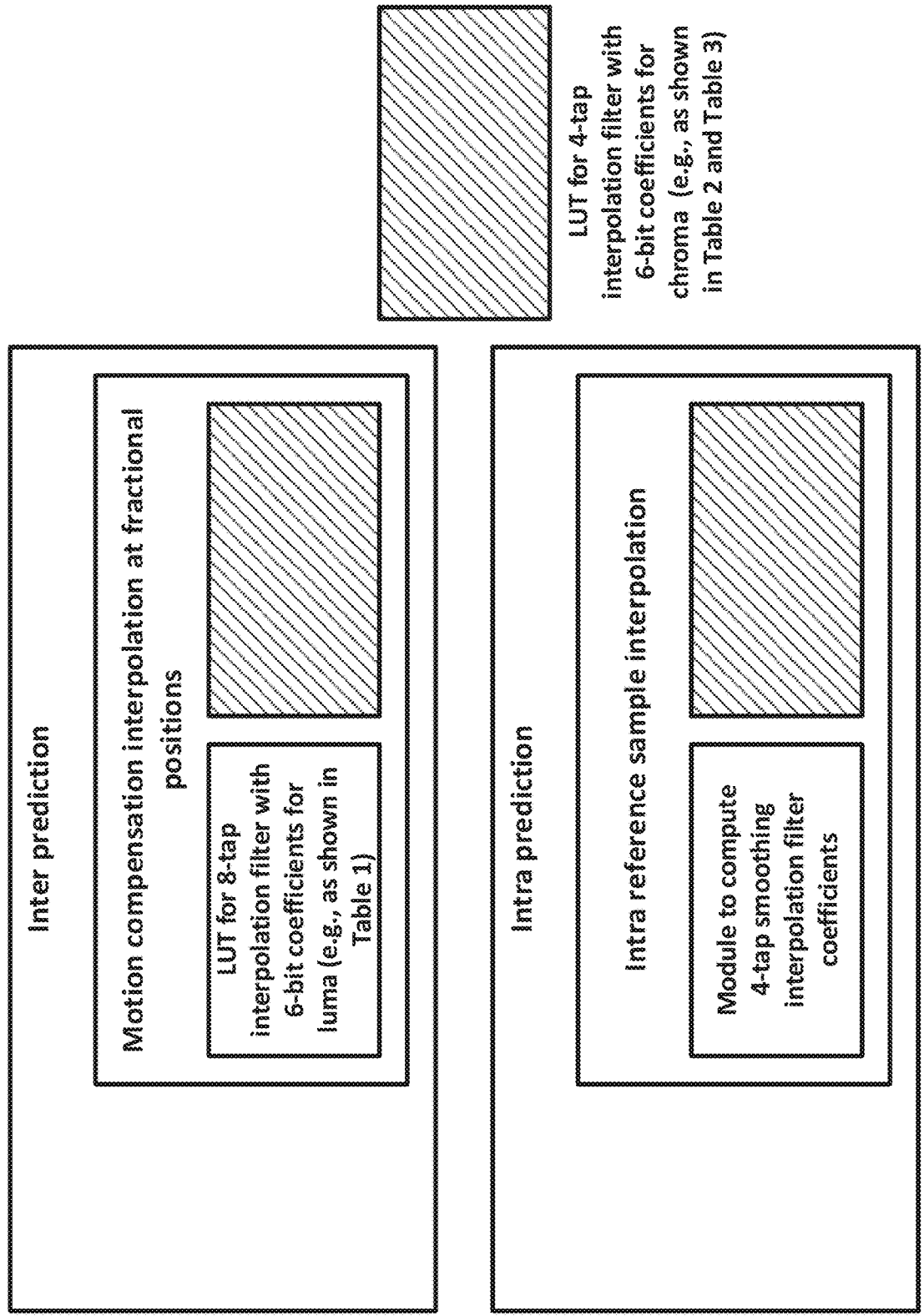
Figure 15:
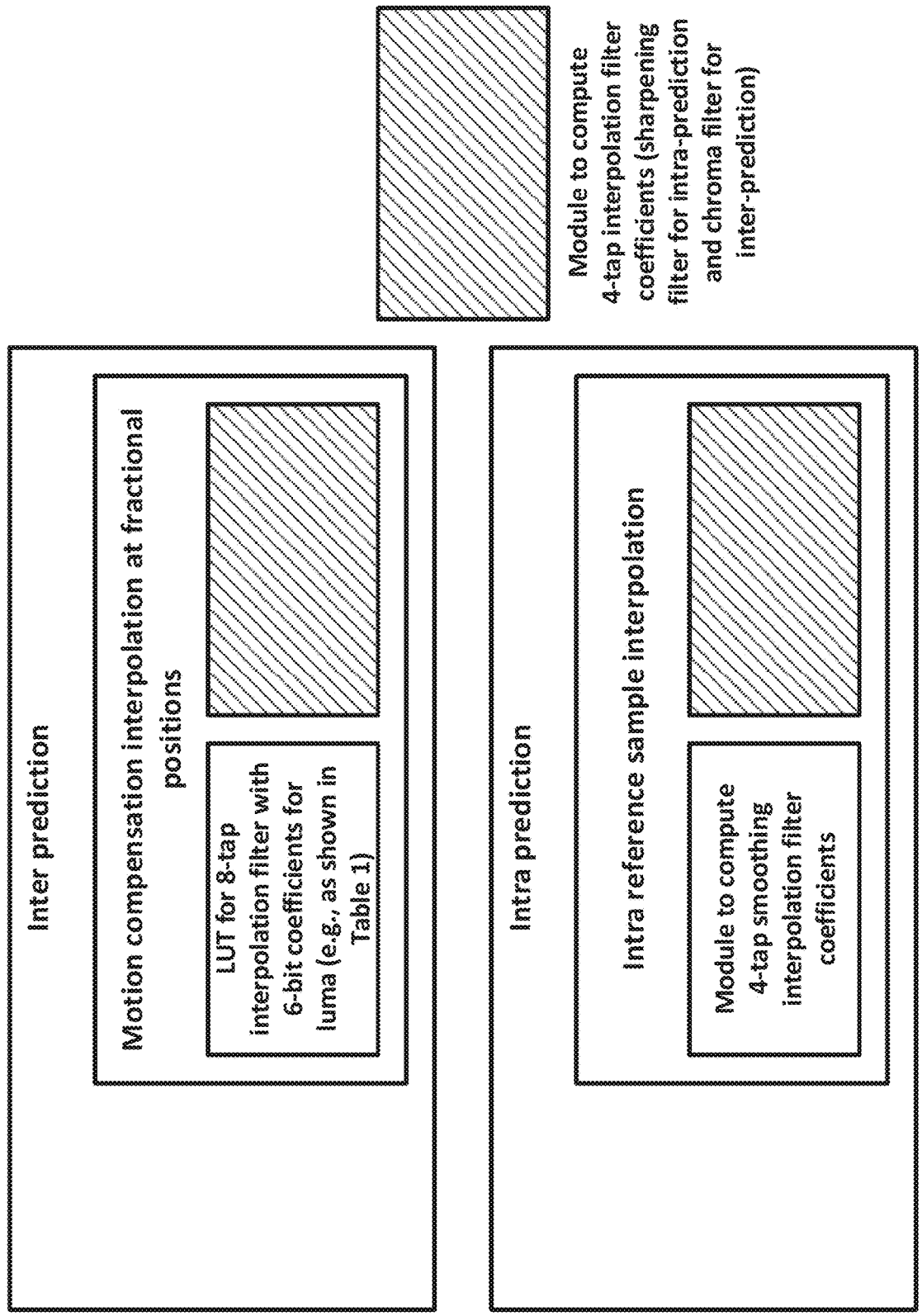
Figure 16:
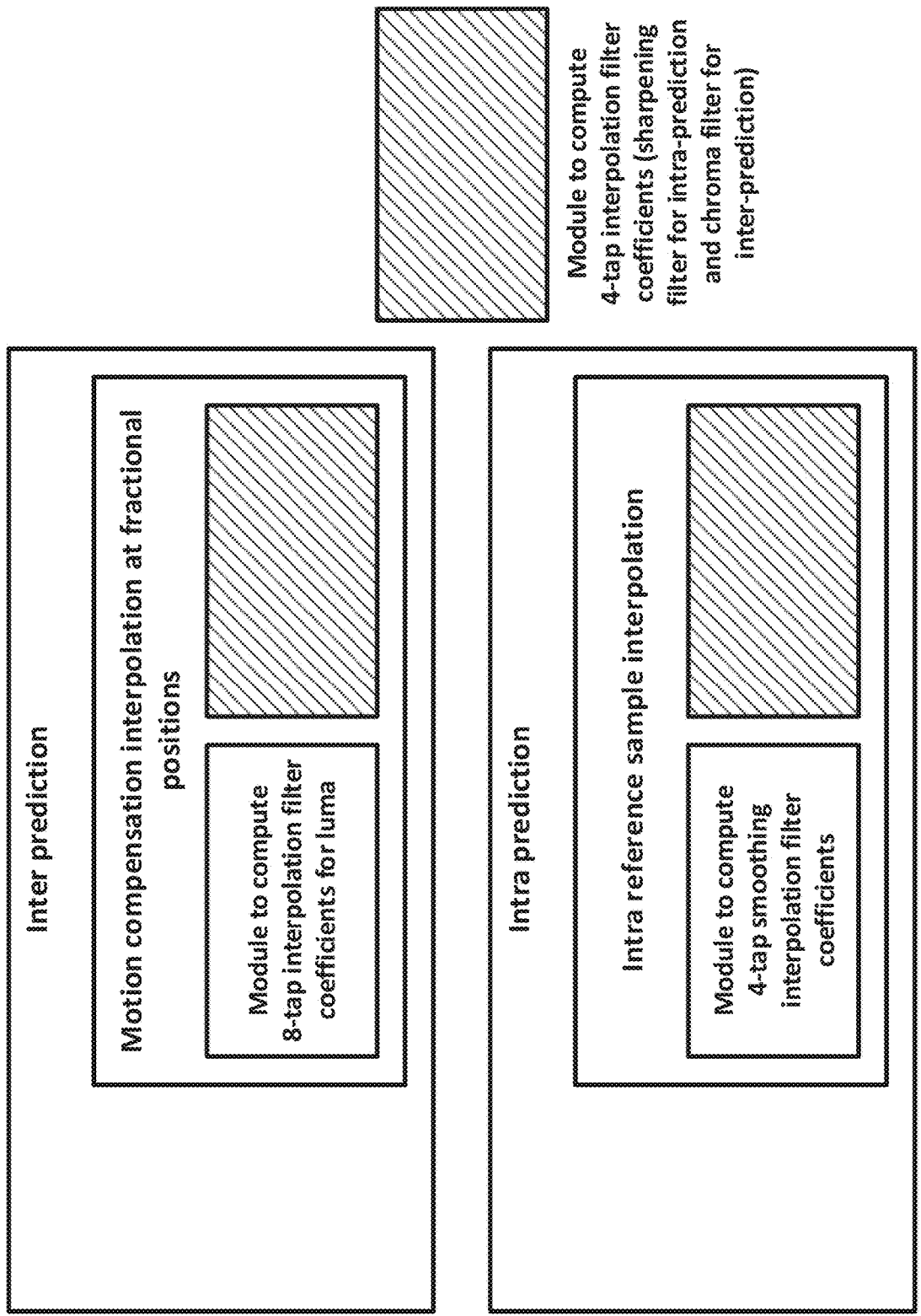

As shown in FIGS. 13-21, different combinations of LUT-based and analytic representations of interpolation filter coefficients are possible for both intra- and inter-prediction. For examples, FIG. 14 illustrates the use-case where coefficients for smoothing interpolation filter used in intra-prediction case are computed whereas coefficients for other interpolation filters for both intra- and inter-prediction are stored in LUTs. In addition, the video coding specification can include both LUT-based and analytic representations of interpolation filter coefficients to enable different implementations. If both representations are described, the LUT-based and the analytic representations should provide identical coefficients.

Figure 22:
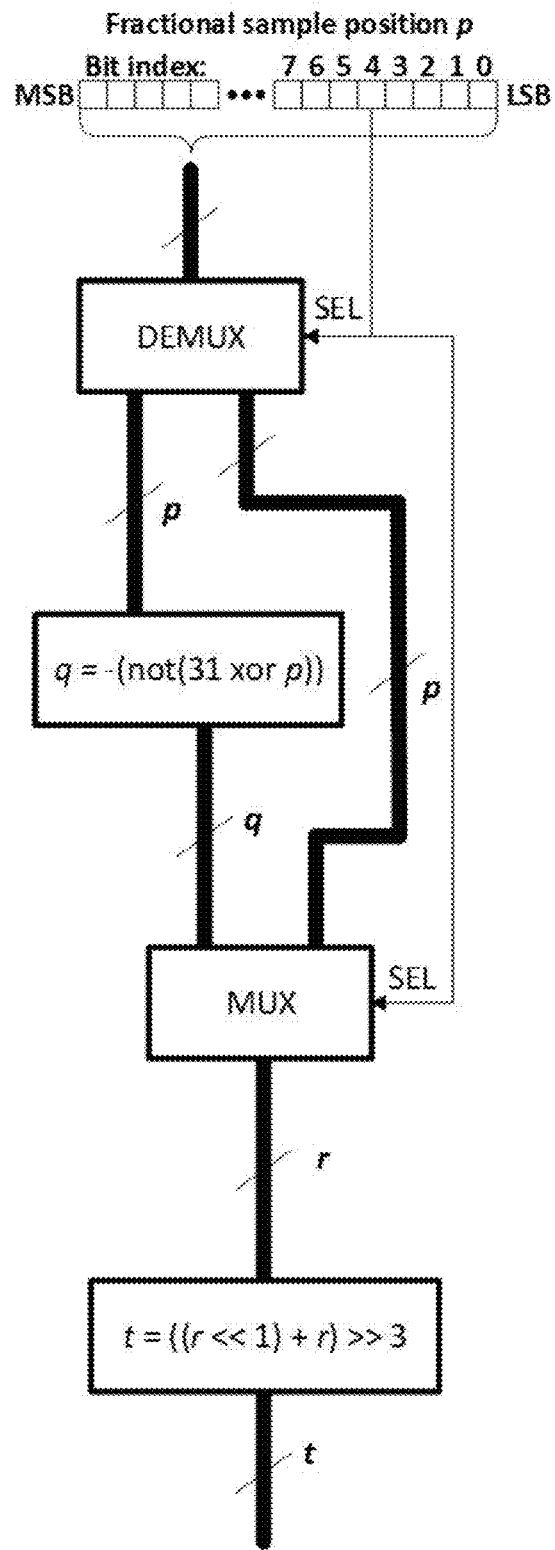
FIG. 22 is a drawing showing an embodiment of the coefficients calculation method.

FIG. 22 represents an implementation of the coefficients calculation method shown in FIG. 1.

In equation $c_0 = -S$ $c_1 = 64 - (p << 1) + S$ $c_2 = (p << 1) + S$ $c_3 = -S$ a strength parameter S is defined as follows:

$$S = \frac{48 - |3p - 48|}{8}.$$

This implementation corresponds to the different way to derive strength parameter S (denoted as a resulting value of "q" in FIG. 22). The value of fractional sample position p is forwarded into the demultiplexer DEMUX that is controlled by the input 1-bit signal SEL, which is set to the value of the $5^{th}$ least significant bit of p (having and index of 4 if indexing starts from zero). If this bit is equal to "1", SEL signal indicates that the value of p is greater than 16 and the following value should be calculated:

q=−(not(31 xor p)), where "not" and "xor" are bitwise NOT and XOR operations, respectively. This expression is tantamount to q=(32−p) and can be written in the C/C++ programming languages as $$q=-(\sim(0x1F\text{^}p))$$

Otherwise (i.e. if the input signal SEL of the demultiplexer DEMUX equals "0"), any calculations are bypassed and the signal p is forwarded to the multiplexer MUX like the signal q. The output signal r of the multiplexer MUX is passed to the module that computes the value of t as follows:

$$t=((r<<1)+r))>>3,$$

where "<<" and ">>" are left and right shift operations, respectively.

In fact, this value of t is a strength parameter S. Further optimization is possible by performing operations shown in FIG. 22 in parallel with the one of coefficients of linear filter:

$$z=(64-(p<<1))$$

As soon as values of both z and S have been computed, they can be added to one another to obtain $c_1=z+S$.

Although the embodiments of the disclosure have been primarily described based on video coding, it should be noted that the embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Summarizing, the present disclosure relates to intra- or inter-prediction for video encoding and decoding. For that purpose, an apparatus and methods obtain a reference sample and a subpixel offset value. A subpixel 4-tap interpolation filter is used to filter the reference sample to obtain a predicted sample value. The filter coefficients of the subpixel 4-tap interpolation filter are defined according to the value of the subpixel offset, such as $$c_0 = 16 - \frac{p}{2},\ c_1 = 16 + 16 - \frac{p}{2},\ c_2 = 16 + \frac{p}{2},\ \text{and}\ c_3 = \frac{p}{2},$$

with p being a fractional part of the value of subpixel offset.

Additional embodiments are summarized in the following clauses:

Clause 1: A method for intra or inter prediction process of video coding technology, the method comprises:

obtaining a reference sample (i.e. at least one reference sample, in an example, a quantity of the reference samples may be four);

obtaining a value of subpixel offset; and filtering, using a subpixel interpolation filter, the reference sample to obtain a predicted sample value, wherein filter coefficients of the subpixel interpolation filter are obtained according to the value of subpixel offset.

Clause 2: The method of Clause 1, wherein the filter coefficient of the subpixel interpolation filter is obtained according to fractional part of the value of subpixel offset.

Clause 3: The method of Clause 1 or 2, wherein the subpixel interpolation filter is an equivalent 4-tap filter.

Clause 4: The method of Clause 3, wherein the filter coefficients of the subpixel interpolation filter are obtained according to $$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fraction part of the value of subpixel offset.

Clause 5: The method of Clause 3, wherein the filter coefficients of the subpixel interpolation filter are obtained according to $$c_0 = -S$$

$$c_1 = 64 - (p<<1) + S$$

$$c_2 = (p<<1) + S$$

$$c_3 = -S$$

wherein a strength parameter S is defined as follows:

$$S = \frac{48 - |3p - 48|}{8}$$

wherein p is a fraction part of the value of subpixel offset.

Clause 6: The method of any one of Clauses 1 to 5, wherein a bit (for example, a lowest bit, or a lower bit) of the subpixel offset p is set to zero.

Clause 7: The method of any one of Clauses 1 to 5, wherein the value of subpixel offset p is incremented by 1 and afterwards lower bit of the incremented value is set to zero prior this value is used to derive filter coefficients.

Clause 8: A method of video coding, the method comprises intra-prediction processing of a block, comprising subpixel interpolation filtering applied to reference samples; wherein the subpixel interpolation filter is a combination of filters, at least one of the filters is determined in accordance with the subpixel offset.

Clause 9: The method of Clause 8, wherein interpolation filter is a smoothing filter that is a parallel combination of two phase-dependent linear filters and a lowpass filter.

Clause 10: The method of Clause 8, wherein interpolation filter is a sharpening filter that is a parallel combination of one phase-dependent linear filter and strength-varying high-pass filter Clause 11: The method of Clause 10, wherein strength-varying high-pass filter is a phase-independent highpass FIR filter, the output of which is multiplied by a phase-dependent strength parameter.

Clause 12: The method of Clause 9, wherein the combination of a filter is an equivalent 4-tap filter having coefficients specified in accordance with the equations:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein p is a fractional sample position p.

Clause 13: The method of Clause 11, wherein the combination of a filter is an equivalent 4-tap filter having coefficients specified in accordance with the equations:

$$c_0 = -S$$

$$c_1 = 64 - (p<<1) + S$$

$$c_2 = (p<<1) + S$$

$$c_3 = -S$$

wherein a strength parameter S is defined as follows:

$$S = \frac{48 - |3p - 48|}{8}.$$

Clause 14: Method of any one of the previous Clauses wherein lower bit of fractional sample position p is set to zero.

Clause 15: Method of any one of Clauses 8-13, wherein fractional sample position p is incremented by 1 and afterwards lower bit of the incremented value is set to zero prior this value is used to derive interpolation filter coefficients.

Clause 16: The method of Clause 10 or 11, wherein clipping operation is performed for the output of the strength-varying high-pass filter.

Clause 17: An encoder (21) comprising processing circuitry for carrying out the method according to any one of Clauses 1 to 16.

Clause 18: A decoder (30) comprising processing circuitry for carrying out the method according to any one of Clauses 1 to 16.

Clause 19: A computer program product comprising a program code for performing the method according to any one of Clauses 1 to 16.

Clause 20: A decoder, comprising:

one or more processors; and a non-transitory computer-readable storage medium coupled to the processors and storing programming for execution by the processors, wherein the programming, when executed by the processors, configures the decoder to carry out the method according to any one of Clauses 1 to 16.

Clause 21: An encoder, comprising:

one or more processors; and a non-transitory computer-readable storage medium coupled to the processors and storing programming for execution by the processors, wherein the programming, when executed by the processors, configures the encoder to carry out the method according to any one of Clauses 1 to 16.

Clause 22: A method for intra or inter prediction process of video coding technology, the method comprises:
obtaining a reference sample (i.e. at least one reference sample, in an example, a quantity of the reference samples may be four);
obtaining a fractional sample position; and
filtering, using a subpixel interpolation filter, the reference sample to obtain a predicted sample value, wherein filter coefficients of the subpixel interpolation filter are obtained according to $c_0 = -S$ $c_1 = 64 - (p<<1) + S$ $c_2 = (p<<1) + S$ $c_3 = -S$ wherein S is a strength parameter, p is the fractional sample position, $c_0$, $c_1$, $c_2$, $c_3$ are the filter coefficients.

Clause 23: The method of Clause 22, wherein the method further comprises:
obtaining a value of a SEL signal by taking the $N^{th}$ least significant bit of the fractional sample position p, N is a positive integer;
obtaining an intermediate value of q, wherein q is set equal to the value of fractional sample position p when the SEL signal is zero; or q is set to –(not (31 xor p)) when the SEL signal is not zero;
obtaining the strength parameter S using one addition operation and shift operations:

$S = ((q<<1) + q) >> 3$

Clause 24: The method of Clause 23, wherein N equals to 5.

Clause 25: The method of any one of Clauses 22 to 24, wherein the subpixel interpolation filter is an equivalent 4-tap filter.

Clause 26: The method of any one of Clauses 22 to 25, wherein the strength parameter S is calculated in parallel with a coefficient of linear filter z, wherein the coefficient of linear filter z is used to obtain the filter coefficient $c_1$ of the subpixel interpolation filter, and wherein $z = 64 - (p<<1)$.

Clause 27: The method of any one of Clauses 22 to 25, wherein a bit (for example, a lowest bit, or a lower bit) of the fractional sample position p is set to zero.

Clause 28: The method of any one of Clauses 22 to 26, wherein the fractional sample position p is incremented by 1 and afterwards lower bit of the incremented value is set to zero prior this value is used to derive filter coefficients.

Clause 29: A method of video coding, the method comprises intra-prediction processing of a block, comprising subpixel interpolation filtering applied to reference samples;
wherein the subpixel interpolation filter is a combination of filters, at least one of the filters is determined in accordance with the fractional sample position.

Clause 29: The method of Clause 28, wherein interpolation filter is a smoothing filter that is a parallel combination of two phase-dependent linear filters and a lowpass filter.

Clause 30: The method of Clause 29, wherein interpolation filter is a sharpening filter that is a parallel combination of one phase-dependent linear filter and strength-varying high-pass filter Clause 31: The method of Clause 30, wherein strength-varying high-pass filter is a phase-independent highpass FIR filter, the output of which is multiplied by a phase-dependent strength parameter.

Clause 32: An encoder (20) comprising processing circuitry for carrying out the method according to any one of Clauses 22 to 31.

Clause 33: A decoder (30) comprising processing circuitry for carrying out the method according to any one of Clauses 22 to 31.

Clause 34: A computer program product comprising a program code for performing the method according to any one of Clauses 22 to 31.

Clause 35: A decoder, comprising:
one or more processors; and
a non-transitory computer-readable storage medium coupled to the processors and storing programming for execution by the processors, wherein the programming, when executed by the processors, configures the decoder to carry out the method according to any one of Clauses 22 to 31.

Clauses 36: An encoder, comprising:
one or more processors; and
a non-transitory computer-readable storage medium coupled to the processors and storing programming for execution by the processors, wherein the programming, when executed by the processors, configures the encoder to carry out the method according to any one of Clauses 22 to 31.

LIST OF REFERENCE SIGNS

Figure 17:
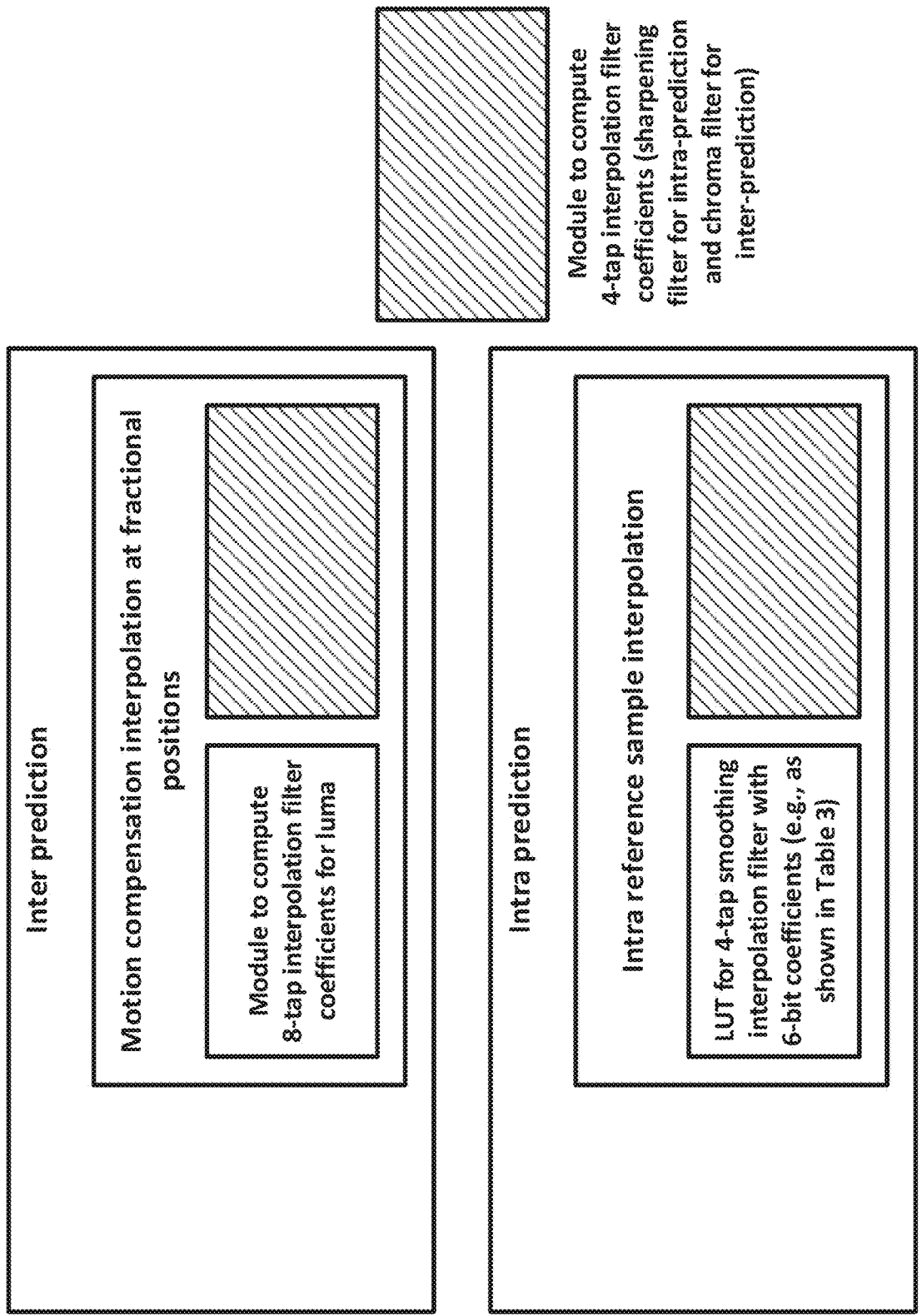
Figure 18:
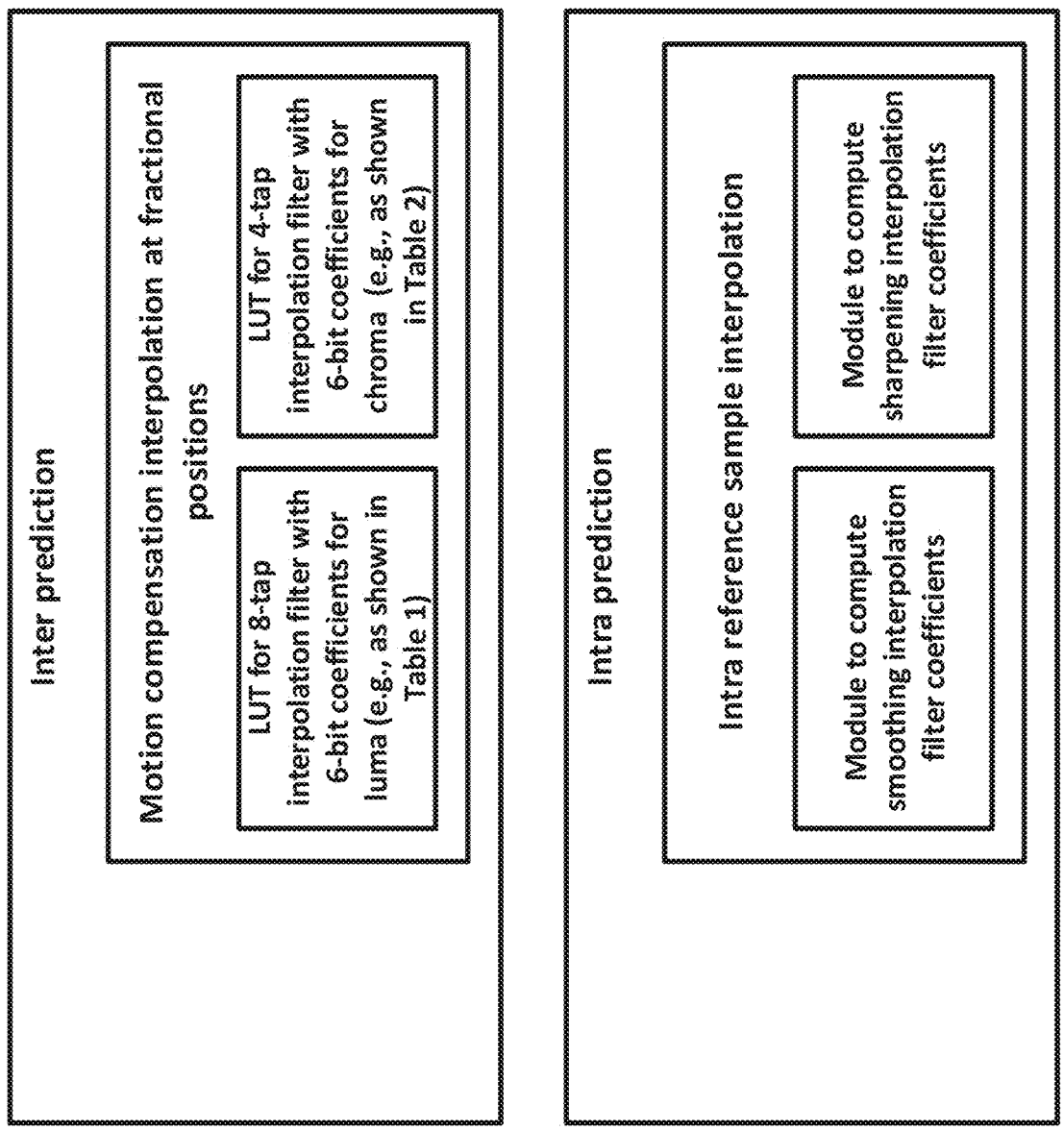
Figure 19:
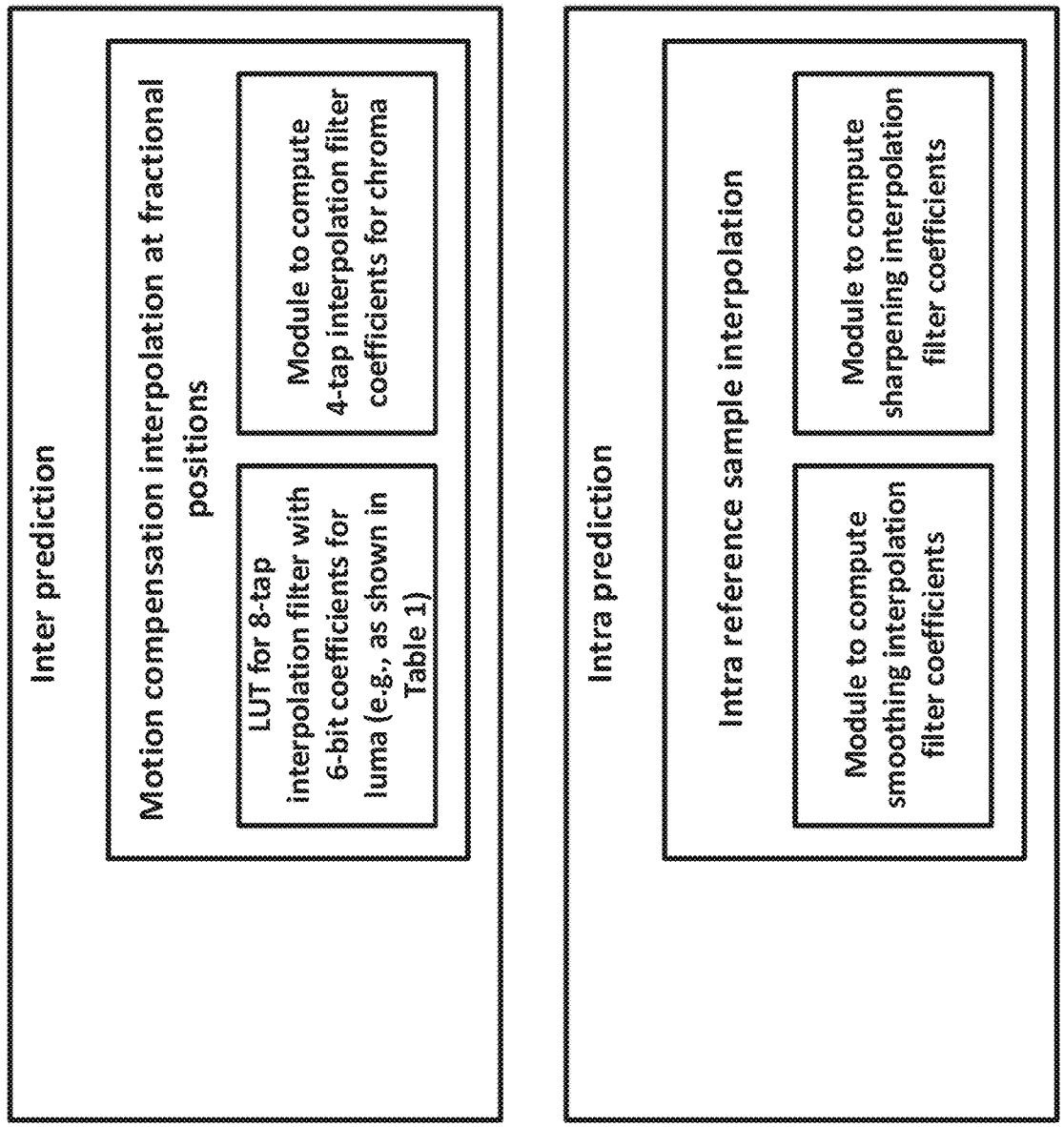
Figure 20:
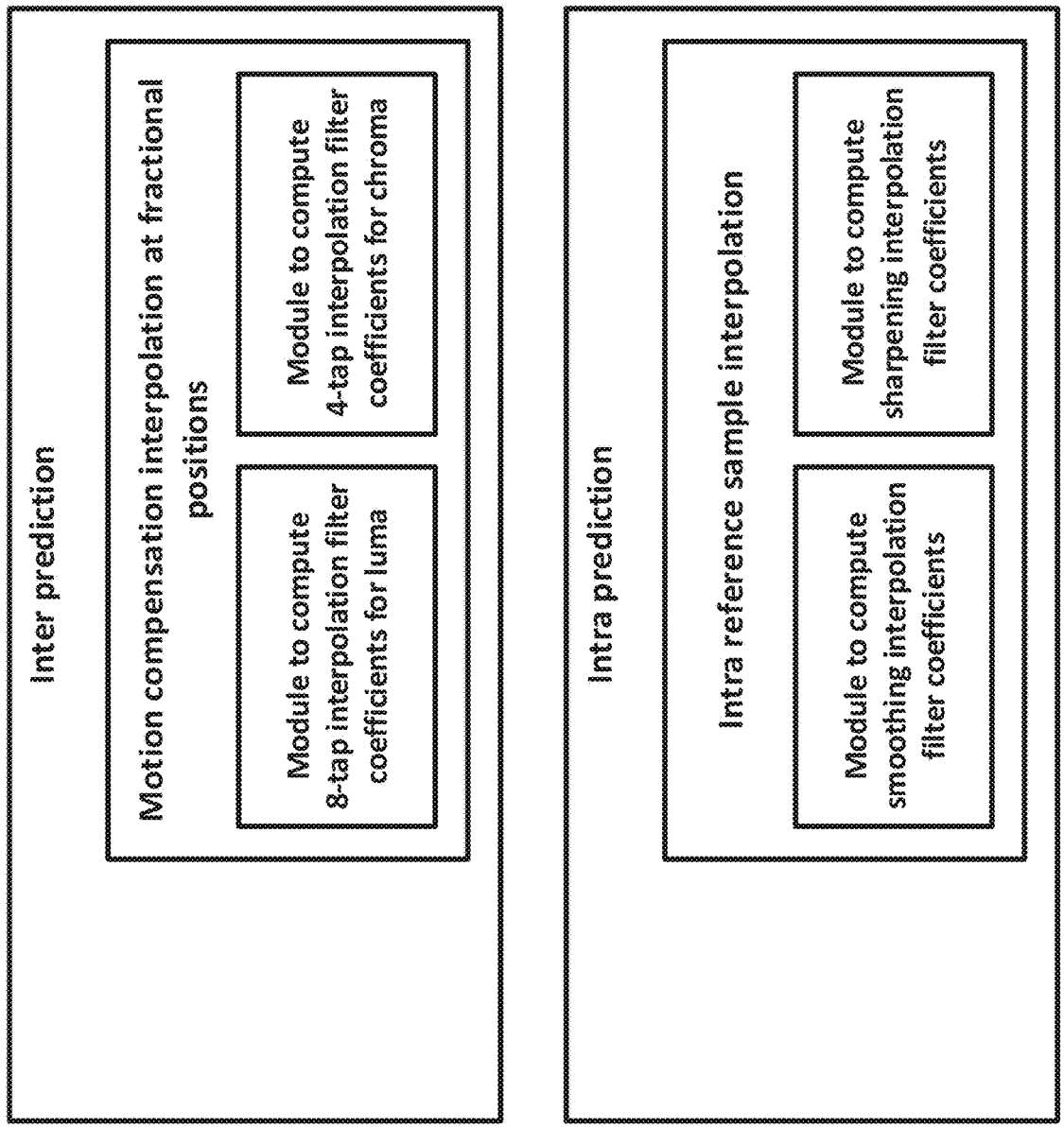

FIG. 1A
10 video coding system
12 source device
13 communication channel
14 destination device
16 picture source
17 picture data
18 pre-processor
19 pre-processed picture data
20 video encoder
21 encoded picture data
22 communication interface
28 communication interface
30 video decoder
31 decoded picture data
32 post processor
33 post-processed picture data
34 display device
FIG. 1B
40 video coding system
41 imaging device(s)
42 antenna
43 processor(s)
44 memory store(s)
45 display device
46 processing circuitry
20 video encoder
30 video decoder
FIG. 2
17 picture (data)
19 pre-processed picture (data)
20 encoder
21 encoded picture data
201 input (interface)
204 residual calculation [unit or operation]

Figure 21:
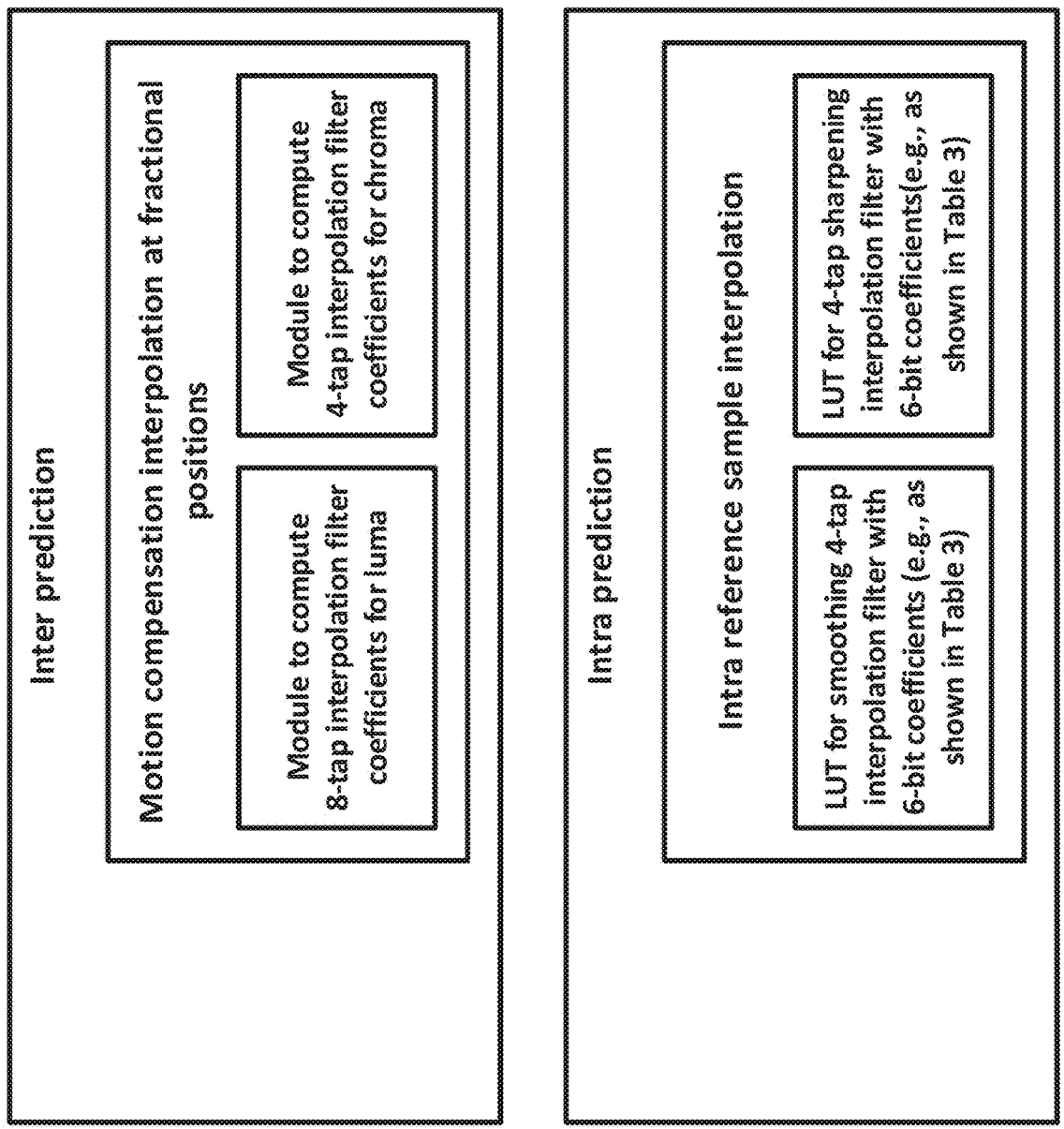

206 transform processing unit
208 quantization unit
210 inverse quantization unit
212 inverse transform processing unit
214 reconstruction unit
220 loop filter unit
230 decoded picture buffer (DPB)
260 mode selection unit
270 entropy encoding unit
272 output (interface)
244 inter prediction unit
254 intra prediction unit
262 partitioning unit
203 picture block
205 residual block
213 reconstructed residual block
215 reconstructed block
221 filtered block
231 decoded picture
265 prediction block
266 syntax elements
207 transform coefficients
209 quantized coefficients
211 dequantized coefficients
FIG. 3
21 encoded picture data
30 video decoder
304 entropy decoding unit
309 quantized coefficients
310 inverse quantization unit
311 dequantized coefficients
312 inverse transform processing unit
313 reconstructed residual block
314 reconstruction unit
315 reconstructed block
320 loop filter
321 filtered block
330 decoded picture buffer DBP
331 decoded picture
360 mode application unit
365 prediction block
366 syntax elements
344 inter prediction unit
354 intra prediction unit
FIG. 4
400 video coding device
410 ingress ports/input ports
420 receiver units Rx
430 processor
440 transmitter units Tx
450 egress ports/output ports
460 memory
470 coding module
FIG. 5
500 source device or destination device
502 processor
504 memory
506 code and data
508 operating system
510 application programs
512 bus
518 display
FIG. 23
2300 flowchart of intra/inter-prediction processing method
FIG. 24
2400 flowchart of video coding method
FIG. 25
2500 intra/inter-processing module
2510 reference sample obtaining unit
2520 subpixel offset value obtaining unit
2530 subpixel interpolation filter
FIG. 26
2600 video coding module
2610 intra-prediction processing unit
2620 subpixel interpolation filter

What is claimed is:

1. A method for intra-prediction or inter-prediction processing of a video frame, comprising:
receiving a bitstream;
applying an entropy decoding algorithm to the bitstream to obtain quantized coefficients, wherein the entropy decoding algorithm is a context adaptive binary arithmetic coding algorithm;
obtaining a residual block based on the quantized coefficients;
obtaining a reference sample;
obtaining a value of a subpixel offset;
filtering, using a 4-tap interpolation filter, the reference sample to obtain a predicted sample value of a prediction block; and
obtaining a decoded picture based on the residual block and the prediction block;
wherein filter coefficients of the 4-tap interpolation filter satisfy equations:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein the filter coefficients of the 4-tap interpolation filter are defined in a table as follows:

| p | $c_0$ | $c_1$ | $c_2$ | $c_3$ |
| --- | --- | --- | --- | --- |
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |

-continued

| p | $c_0$ | $c_1$ | $c_2$ | $c_3$ |
|---|---|---|---|---|
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients of the 4-tap interpolation filter.

2. The method according to claim 1, wherein a bit of p is set to zero.

3. The method according to claim 1, wherein p is incremented by 1 and afterwards a lower bit of the incremented p is set to zero prior to using p to obtain the filter coefficients.

4. The method according to claim 1, wherein the obtaining of the filter coefficients comprises calculating the filter coefficients according to $$c_0 = 16 - \frac{p}{2}$$
$$c_1 = 16 + c_0$$
$$c_2 = c_0 + p$$
$$c_3 = c_0 - p.$$

5. A method for intra-prediction or inter-prediction processing of a video frame, comprising:
   obtaining a to-be-encoded picture block;
   obtaining a reference sample;
   obtaining a value of a subpixel offset;
   filtering, using a 4-tap interpolation filter, the reference sample to obtain a predicted sample value of a prediction block;
   obtaining a residual block based on the prediction block and the to-be-encoded picture block;
   obtaining quantized coefficients based on the residual block; and
   applying an entropy encoding algorithm to the quantized coefficients to obtain a bitstream, wherein the entropy encoding algorithm is a context adaptive binary arithmetic coding algorithm;
   wherein filter coefficients of the 4-tap interpolation filter satisfy equations:

$$c_0 = 16 - \frac{p}{2}$$
$$c_1 = 16 + 16 - \frac{p}{2}$$
$$c_2 = 16 + \frac{p}{2}$$
$$c_3 = \frac{p}{2}$$

wherein the filter coefficients of the 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients of the 4-tap interpolation filter.

6. The method according to claim 5, wherein a bit of p is set to zero.

7. The method according to claim 5, wherein p is incremented by 1 and afterwards a lower bit of the incremented p is set to zero prior to using p to obtain the filter coefficients.

8. The method according to claim 5, wherein the obtaining of the filter coefficients comprises calculating the filter coefficients according to $$c_0 = 16 - \frac{p}{2}$$
$$c_1 = 16 + c_0$$
$$c_2 = c_0 + p$$
$$c_3 = c_0 - p.$$

9. A video decoder, comprising:
   at least one processor; and
   one or more memories coupled to the at least one processor and storing programming instructions for execution by the at least one processor to cause the video decoder to:
   receive a bitstream;
   apply an entropy decoding algorithm to the bitstream to obtain quantized coefficients, wherein the entropy decoding algorithm is a context adaptive binary arithmetic coding algorithm;

obtain a residual block based on the quantized coefficients;

obtain a reference sample;

obtain a value of a subpixel offset;

filter, using a 4-tap interpolation filter, the reference sample to obtain a predicted sample value of a prediction block; and obtaining a decoded picture based on the residual block and the prediction block;

wherein filter coefficients of the 4-tap interpolation filter satisfy equations:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein the filter coefficients of the 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients of the 4-tap interpolation filter.

10. The video decoder according to claim 9, wherein a bit of p is set to zero.

11. The video decoder according to claim 9, wherein p is incremented by 1 and afterwards a lower bit of the incremented p is set to zero prior to using p to obtain the filter coefficients.

12. The video decoder according to claim 9, wherein the obtaining of the filter coefficients comprises calculating the filter coefficients according to $$c_0 = 16 - \frac{p}{2}$$

$$c_1 = 16 + c_0$$

$$c_2 = c_0 + p$$

$$c_3 = c_0 - p.$$

13. A video encoder, comprising:

at least one processor; and one or more memories coupled to the at least one processor and storing programming instructions for execution by the at least one processor to cause the video encoder to:

obtain a to-be-encoded picture block;

obtain a reference sample;

obtain a value of a subpixel offset;

filter, using a 4-tap interpolation filter, the reference sample to obtain a predicted sample value of a prediction block;

obtain a residual block based on the prediction block and the to-be-encoded picture block;

obtain quantized coefficients based on the residual block; and apply an entropy encoding algorithm to the quantized coefficients to obtain a bitstream, wherein the entropy encoding algorithm is a context adaptive binary arithmetic coding algorithm;

wherein filter coefficients of the 4-tap interpolation filter satisfy equations:

$$c_0 = 16 - \frac{p}{2}$$

$$c_1 = 16 + 16 - \frac{p}{2}$$

$$c_2 = 16 + \frac{p}{2}$$

$$c_3 = \frac{p}{2}$$

wherein the filter coefficients of the 4-tap interpolation filter are defined in a table as follows:

| p | $c_0$ | $c_1$ | $c_2$ | $c_3$ |
|---|---|---|---|---|
| 0 | 16 | 32 | 16 | 0 |
| 1 | 16 | 32 | 16 | 0 |
| 2 | 15 | 31 | 17 | 1 |
| 3 | 15 | 31 | 17 | 1 |
| 4 | 14 | 30 | 18 | 2 |
| 5 | 14 | 30 | 18 | 2 |
| 6 | 13 | 29 | 19 | 3 |
| 7 | 13 | 29 | 19 | 3 |
| 8 | 12 | 28 | 20 | 4 |
| 9 | 12 | 28 | 20 | 4 |
| 10 | 11 | 27 | 21 | 5 |
| 11 | 11 | 27 | 21 | 5 |
| 12 | 10 | 26 | 22 | 6 |
| 13 | 10 | 26 | 22 | 6 |
| 14 | 9 | 25 | 23 | 7 |
| 15 | 9 | 25 | 23 | 7 |
| 16 | 8 | 24 | 24 | 8 |
| 17 | 8 | 24 | 24 | 8 |

-continued

| p | $c_0$ | $c_1$ | $c_2$ | $c_3$ |
|---|---|---|---|---|
| 18 | 7 | 23 | 25 | 9 |
| 19 | 7 | 23 | 25 | 9 |
| 20 | 6 | 22 | 26 | 10 |
| 21 | 6 | 22 | 26 | 10 |
| 22 | 5 | 21 | 27 | 11 |
| 23 | 5 | 21 | 27 | 11 |
| 24 | 4 | 20 | 28 | 12 |
| 25 | 4 | 20 | 28 | 12 |
| 26 | 3 | 19 | 29 | 13 |
| 27 | 3 | 19 | 29 | 13 |
| 28 | 2 | 18 | 30 | 14 |
| 29 | 2 | 18 | 30 | 14 |
| 30 | 1 | 17 | 31 | 15 |
| 31 | 1 | 17 | 31 | 15 | wherein p is a fractional part of the value of the subpixel offset, and $c_0$, $c_1$, $c_2$, and $c_3$ are the filter coefficients of the 4-tap interpolation filter.

14. The video encoder according to claim 13, wherein a bit of p is set to zero.

15. The video encoder according to claim 13, wherein p is incremented by 1 and afterwards a lower bit of the incremented p is set to zero prior to using p to obtain the filter coefficients.

16. The video encoder according to claim 13, wherein the obtaining of the filter coefficients comprises calculating the filter coefficients according to $$c_0 = 16 - \frac{p}{2}$$
$$c_1 = 16 + c_0$$
$$c_2 = c_0 + p$$
$$c_3 = c_0 - p.$$

* * * * *